US012711769B2

(12) United States Patent
Huang et al.

(10) Patent No.: US 12,711,769 B2
(45) Date of Patent: Aug. 18, 2026

(54) LANGUAGE INSTRUCTED TEMPORAL LOCALIZATION IN VIDEOS

(71) Applicant: NVIDIA Corporation, Santa Clara, CA (US)

(72) Inventors: De-An Huang, Cupertino, CA (US); Shijia Liao, Santa Clara, CA (US); Subhashree Radhakrishnan, Milpitas, CA (US); Hongxu Yin, San Jose, CA (US); Pavlo Molchanov, Mountain View, CA (US); Zhiding Yu, Santa Clara, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 102 days.

(21) Appl. No.: 18/787,651

(22) Filed: Jul. 29, 2024

(65) Prior Publication Data

US 2025/0191369 A1 Jun. 12, 2025

Related U.S. Application Data

(60) Provisional application No. 63/606,736, filed on Dec. 6, 2023.

(51) Int. Cl.
*G06V 20/40* (2022.01)
*G06F 40/284* (2020.01)

(52) U.S. Cl.
CPC ............ *G06V 20/49* (2022.01); *G06F 40/284* (2020.01); *G06V 20/44* (2022.01)

(58) Field of Classification Search
None
See application file for complete search history.

(56) References Cited

U.S. PATENT DOCUMENTS

2021/0248375 A1* 8/2021 Geng .................. G06N 3/0455
2022/0053171 A1* 2/2022 Naphade .......... G08B 13/19673
2025/0166377 A1* 5/2025 Wang .................... G06V 10/82

OTHER PUBLICATIONS

Alayrac, J.B., et al., "Flamingo: a visual language model for few-shot learning," in NeurIPS, 2022.
Awadalla, A., et al., "OpenFlamingo: An open-source framwork for training large autorregressive vision-language models," arXiv:2308.01390, 2023.
Brown, T., et al., "Language models are few-shot learners," In NeurIPS, 2020.
Heilbron, F.C., et al., "Activitynet: A large-scale video benchmark for human activity understanding," in CVPR, 2015.

(Continued)

*Primary Examiner* — Heather R Jones
(74) *Attorney, Agent, or Firm* — Leydig, Voit & Mayer, Ltd.

(57) ABSTRACT

Embodiments of the present disclosure relate to language instructed temporal localization in videos, and provide multimodal large language models (LLMs) for performing language instructed temporal localization in video, as well as methods for training and implementing such models. In contrast to conventional systems, models according to embodiments of the present disclosure are designed to answer "when?" questions, while simultaneously improving other relevant capabilities of multimodal LLMs.

37 Claims, 20 Drawing Sheets

(56) References Cited

OTHER PUBLICATIONS

Chen, J., et al., "MiniCPT-v2: large language model as a unified interface for vision-language multi-task learning," arXiv:2310.09478, 2023.
Chiang, W.L., et al., "Vicuna: an open-source chatbot impressing GPT-4 with 90% chatGPT quality," The Vicuna Team, 2023.
Chowdhery, A., et al., "PaLM: Scaling language modeling with pathways," arXiv:2204.02311, 2022.
Dai, W., et al., "InstructBLIP: Towards general-purpose vision-language models with instruction tuning," 2023.
Damen, D., et al., "The Epic-Kitchens Dataset: Collection, challenges and baselines," IEEE Trans. PAMI, 43 (11):4125-4141, 2021.
Damen, D., et al., "Rescaling egocentric vision: Collection, pipeline and challenges for epic-kitchens-100," IJCV, 130: 33-55, 2022.
Devlin, J., et al., "BERT: Pre-training of deep bidirectional transformers for language understanding," In NAACL, 2019.
Feichtenhofer, C., et al., "SlowFast networks for video recognition," In ICCV, 2019.
Huang, G., et al., "Multimodal pretraining for dense video captioning," In AACL-IJCNLP, 2020.
Jiang, Y.G., et al., "Thumos challenge: Action recognition with a large number of classes," 2014.
Krishna, R., et al., "Dense-captioning events in videos," In ICCV, 2017.
Keuhne, H., et al., "The language of actions: Recovering the syntax and semantics of goal-directed human activities," In CVPR, 2014.
Lai, X., et al., "Lisa: Reasoning segmentation via large language model," arXiv:2308.00692, 2023.
Li, B., et al., "MIMIC-IT: Multi-modal in-context instruction tuning," arXiv:2306.05425, 2023.
Kunchang, L., et al., "VideoChat: Chat-centric video understanding," arXiv:2305.06355, 2023.
Liu, H., et al., "Improved baselines with visual instruction tuning," arXiv:2310.03744, 2023.
Liu, H., et al., "Visual instruction tuning," In NeurIPS, 2023.
Luo, R., et al., "Valley: Video assistant with large language model enhanced ability," 2023.
Miech, A., et al., "HowTo100M: Learning a text-video embedding by watching hundred million narrated video clips," In ICCV, 2019.
Maaz, M., et al., "Video-ChatGPT: Towards detailed video understanding via large vision and language models," arXiv:2306.05424, 2023.
OpenAI GPT-4 technical report, arXiv:2303.08774, 2023.
Peng, Z., et al., "Kosmos-2: Grounding multimodal large language models to the world," arXiv:2306.14824, 2023.
Radford, A., et al., "Learning transferable visual models from natural language supervision," in ICML 2021.
Sigurdsson, G., et al., "Hollywood in homes: Crowdsourcing data collection for activity understanding," in ECCV, 2016.
Tang, Y., et al., "Coin: A large-scale dataset for comprehensive instructional video analysis," in CVPR, 2019.
Touvron, H., et al., "LLaMA: Open and efficient foundation language models," arXiv:2302.13971, 2023.
Touvron, H., et al., "LLaMA 2: Open foundation and fine-tuned chat models," arXiv:2307.09288, 2023.
Wu, S., et al., "NExT-GPT: Any-t0-any multimodal LLM," arXiv:2309.05519, 2023.
Xiao, J., et al., "NExT-QA: Next phase of question-answering to explaining temporal actions," In CVPR, 2021.
Yan, S., et al., "UnLoc: A unified framework for video localization tasks," in ECCV, 2023.
Yang, A., et al., "Vid2Seq: Large-scale pretraining of a visual language model for dense video captioning," in CVPR, 2023.
Zhang, H., et al., "Video-LLaMA: An instruction-tuned audio-visual language model for video understanding," arXiv:2306.02858, 2023.
Zhang, R., et al., "LLaMA-Adapter: Efficient fine-tuning of language models with zero-init attention," arXiv:2303.16199, 2023.
Zhang, Y., et al., "Siren's song in the AI ocean: A survey on hallucination n large language models," arXiv:2309.01219, 2023.
Zhou, L., et al., "Towards automatic learning procedures from web instructional videos," In AAAI, 2018.
Zhu, D., et al., "MiniGPT-4: Enhancing vision-language understanding with advanced large language models," arXiv:2304.10592, 2023.

* cited by examiner

Q: When does the woman's dance become the most energetic in the video?

A: Her dance is the most energetic between 7.37s and 12.81s when she does a handspring, which is more energetic than standing and lying on the floor.

Q: When is the first time the group members have to adjust their position to avoid obstacles during their journey?

A: [32.71s 45.09s] The group members have to adjust their position to avoid obstacles between 32.71s and 45.09s when they duck down to go under a low clearance bridge.

FIG. 1D
JACK NUNN
STANDARD ROW
1-ARM ROW
1-LEG ROW

Q: When is the athlete working on his balance and stability?

A: [46.97s 60.71s] The athlete is working on his balance and stability between 46.97s and 60.71s when he switches to a one leg stance on the machine. Standing on one leg improves balance and engages the core muscles for stability.

Q: When is the man on the stage engaging the kids in the most atypical ways of jump roping?

A: [127.22s 141.35s] The man on the stage is engaging the kids in the most atypical ways of jump roping between 127.22s and 141.35s. During this time, he sits on the floor and jumps rope, which contrasts to the common standing position for jump roping.

Q: When is the girl and boy's second arm wrestling match?

LITA: The girl and boy's second arm wrestling match is between 25.94s and 51.36s. They redo the arm wrestling during this time.

Video-LLaMA-v2: The girl and boy are not shown to have an arm wrestling match in the video.

Q: When do the boys engage in an activity related to the fire, other than building it? *(annot: 66.66s to 123.44s)*

LITA: The boys engage in an activity related to the fire, other than building it, between 99.75s and 123.44s. During this time, they are seen roasting marshmallows in the campfire.

Video-LLaMA-v2: The boys engage in an activity related to the fire when they are seen cooking food on the fire.

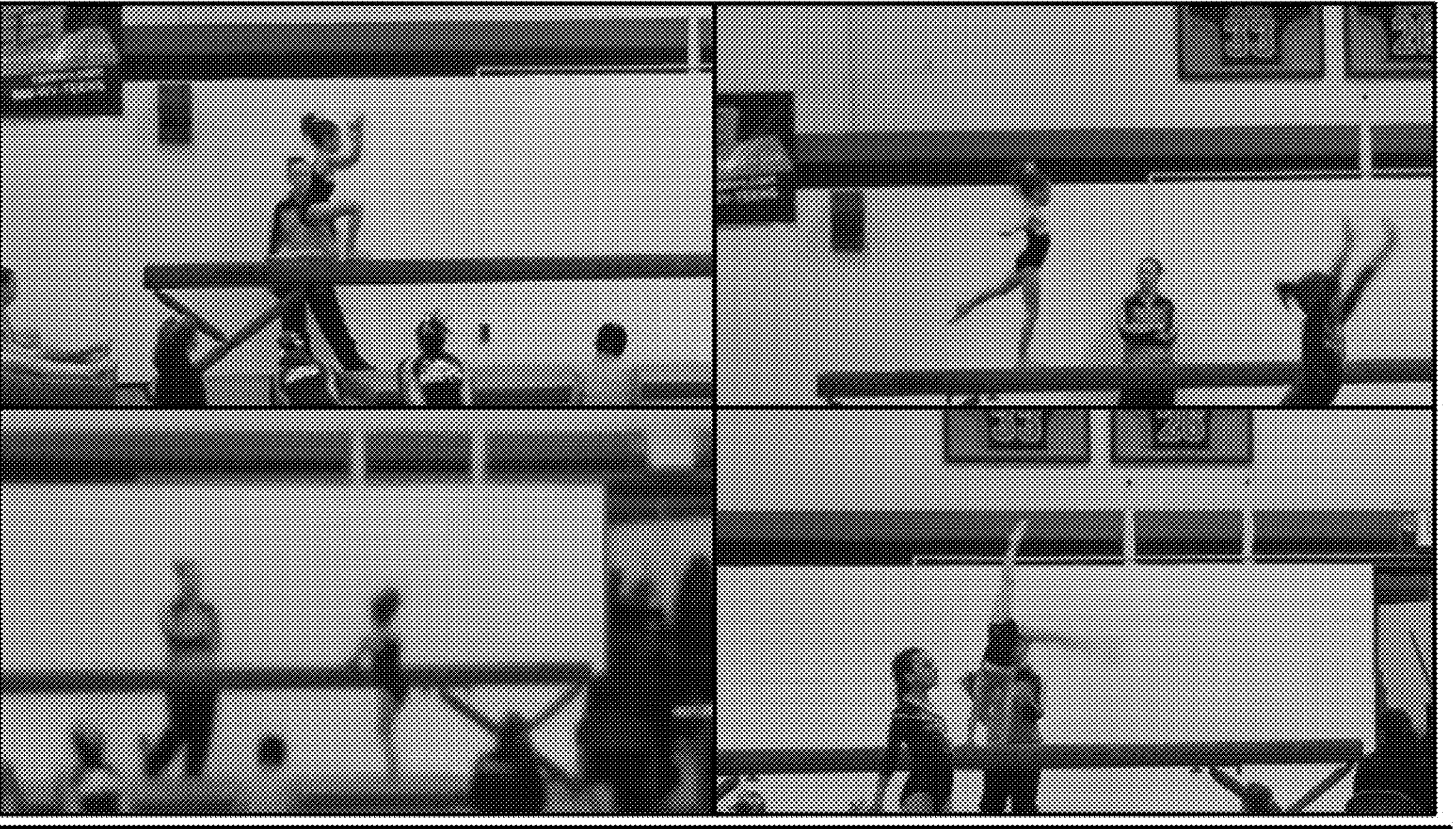

Q: When does the girl show resilience in her performance? *(annot: 37.57s to 55.66s)*

LITA: The girl shows resilience in her performance between 38.23s and 55.66s. During this time, she falls off the beam but gets back on it and continues her performance.

Video-LLaMA-v2: The girl shows resilience in her performance when she is able to maintain her balance and continues her routine despite the obstacles she faces.

FIG. 1H

| **Q1**: What are they doing in the video? |
|---|
| **RTL Only**: [104.87s 167.46s] They are scuba diving in the sea next to a rocky shore with a lot of greenery around. |
| **No NLVQA**: scuba diving |
| **LITA**: In the video, we see a group of people scuba diving in an underwater environment. They are exploring the ocean floor, looking at fish and wildlife, and enjoying the beautiful scenery. |

| **Q1**: Is there any fish in the video? |
|---|
| **RTL Only**: [104.87s 167.46s] There are fish in the video between 104.87s and 167.46s. During this time, the scuba divers are seen swimming with the fishes. |
| **No NLVQA**: yes |
| **LITA**: Yes, there are fish in the video. At one point, we see a school of fish swimming around the scuba divers. |

| **Q1**: When are they enduring the most water pressure? |
|---|
| **RTL Only**: The scuba divers are enduring the most water pressure between 81.19s and 167.46s. This is the deepest part of their dive, where the pressure is the greatest. |
| **No NLVQA**: [55.82 86.27s] The scuba divers are enduring the most water pressure between 55.82 86.27s. This is because they are diving deeper to explore the ocean floor. |
| **No NLVQA**: The scuba divers are enduring the most water pressure between 6.77s and 18.61s. This is when they are deep water scuba diving, which is when the water pressure is at its highest. |

FIG. 1I
(continued)

| Model | Size | mIOU | P@0.5 | Score |
|---|---|---|---|---|
| LITA-7B | 7B | 24.1 | 21.2 | 44.0 |
| Video-LLaMA-v2 [41] | 13B | – | – | 32.1 |
| Video-ChatGPT [27] | 13B | – | – | 38.8 |
| Slow Tokens Only | 13B | 14.6 | 11.8 | 32.2 |
| SlowFast Tokens | 13B | 17.5 | 14.5 | 34.1 |
| LITA-13B | 13B | **28.6** | **25.9** | **46.3** |

FIG. 2A

| Model | Correctness | Detail | Context | Temporal | Consistency | Average |
|---|---|---|---|---|---|---|
| LLaMA-Adapter | 2.03 | 2.32 | 2.30 | 1.98 | 2.15 | 2.16 |
| Video-LLaMA | 1.96 | 2.18 | 2.16 | 1.82 | 1.79 | 1.98 |
| Video-LLaMA-v2 | 2.36 | 2.42 | 2.74 | 1.83 | 2.12 | 2.29 |
| VideoChat | 2.23 | 2.50 | 2.53 | 1.94 | 2.24 | 2.29 |
| Video-ChatGPT | 2.40 | 2.52 | 2.62 | 1.98 | 2.37 | 2.38 |
| LITA | **2.94** | **2.98** | **3.43** | **2.68** | **3.19** | **3.04** |

FIG. 2B

| Model | RTL | Video | NLVQA | mIOU | P@0.5 | Score |
|---|---|---|---|---|---|---|
| RTL Only | ✓ | ✗ | ✗ | 26.6 | 20.9 | 43.5 |
| No NLVQA | ✓ | ✓ | ✗ | 26.9 | 23.5 | 44.9 |
| LITA | ✓ | ✓ | ✓ | **28.6** | **25.9** | **46.3** |

FIG. 2C

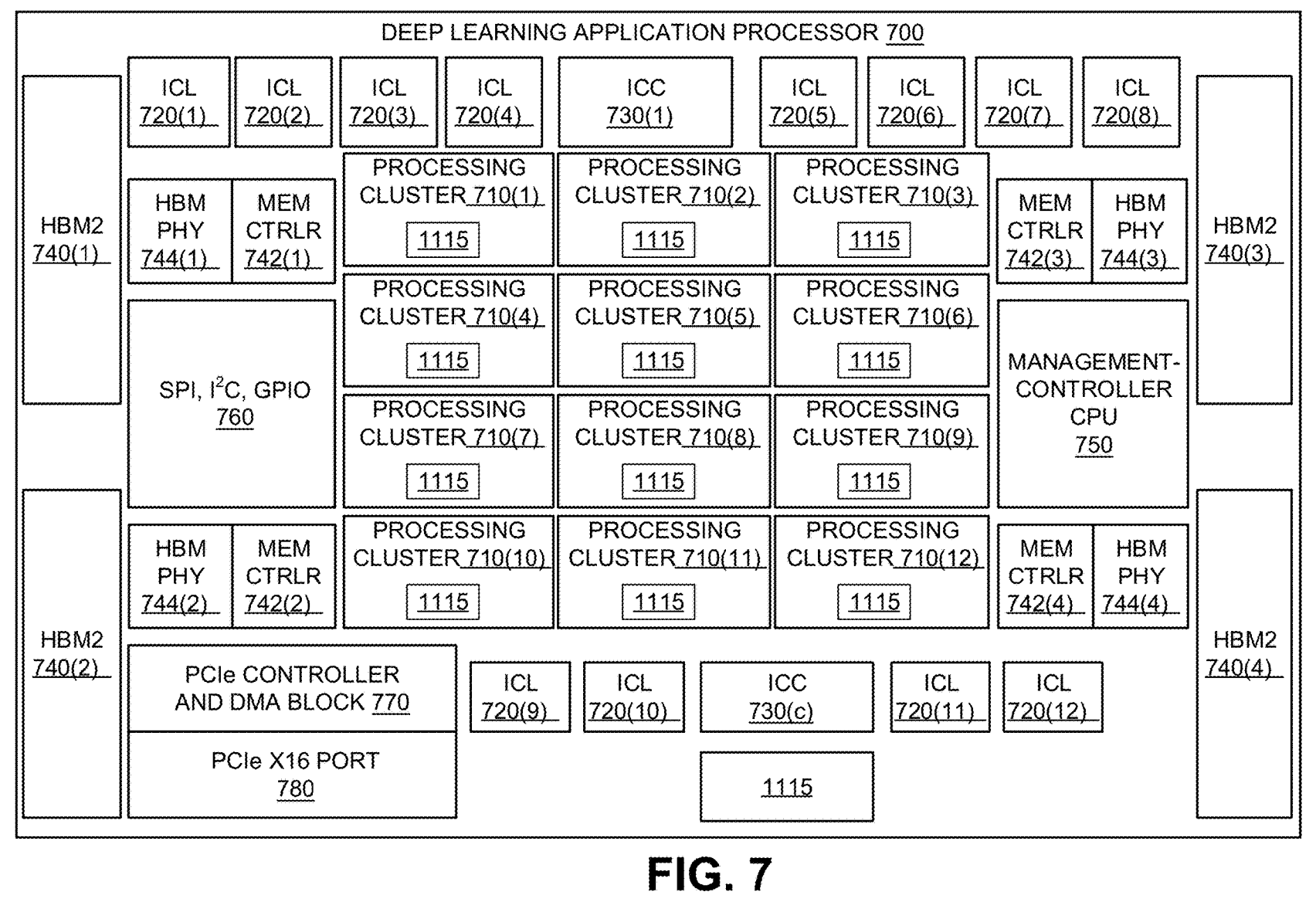

DEEP LEARNING APPLICATION PROCESSOR 700

HBM2 740(1)

HBM2 740(2)

HBM2 740(3)

HBM2 740(4)

ICL 720(1)

ICL 720(2)

ICL 720(3)

ICL 720(4)

ICC 730(1)

ICL 720(5)

ICL 720(6)

ICL 720(7)

ICL 720(8)

HBM PHY 744(1)

MEM CTRLR 742(1)

PROCESSING CLUSTER 710(1) 1115

PROCESSING CLUSTER 710(2) 1115

PROCESSING CLUSTER 710(3) 1115

MEM CTRLR 742(3)

HBM PHY 744(3)

SPI, $I^2C$, GPIO 760

PROCESSING CLUSTER 710(4) 1115

PROCESSING CLUSTER 710(5) 1115

PROCESSING CLUSTER 710(6) 1115

PROCESSING CLUSTER 710(7) 1115

PROCESSING CLUSTER 710(8) 1115

PROCESSING CLUSTER 710(9) 1115

MANAGEMENT-CONTROLLER CPU 750

HBM PHY 744(2)

MEM CTRLR 742(2)

PROCESSING CLUSTER 710(10) 1115

PROCESSING CLUSTER 710(11) 1115

PROCESSING CLUSTER 710(12) 1115

MEM CTRLR 742(4)

HBM PHY 744(4)

PCIe CONTROLLER AND DMA BLOCK 770

PCIe X16 PORT 780

ICL 720(9)

ICL 720(10)

ICC 730(c)

1115

ICL 720(11)

ICL 720(12)

FIG. 7

LANGUAGE INSTRUCTED TEMPORAL LOCALIZATION IN VIDEOS

CROSS-REFERENCE TO RELATED APPLICATIONS

This application claims the benefit of U.S. Provisional Application No. 63/606,736 titled "Language Instructed Temporal Localization in Videos," filed Dec. 6, 2023, the entire contents of which are incorporated herein by reference.

FIELD

The present disclosure relates to Video LLMs (Vid-LLMs) and, in particular, to language instructed temporal localization in videos.

BACKGROUND

Large language models (LLMs) have demonstrated impressive instruction following capabilities, and shown that language can be a universal interface for various tasks. These models can be further extended to multimodal LLMs to process language and other modalities, such as image, video, and audio. Some approaches to extending LLMs add additional parameters, such as gated cross-attention layers or adapter layers, inside the LLM to adapt the LLM to process multimodal inputs. Other approaches only use modules, such as projection layers or Q-Formers, to project outputs of visual encoders to the input space of LLMs. Recent works further expand multimodal LLM to visual grounding tasks, such as detection and segmentation.

While most multimodal LLMs focus on images for visual content, several recent works introduce models that specialize in processing videos. While standard LLMs are trained on text data and generate text outputs, Video LLMs (Vid-LLMs) are trained to handle both video and text data, enabling them to analyze the content of videos and generate relevant textual descriptions or responses. These Vid-LLMs preserve the instruction following capabilities of LLMs and further allow users to ask various questions about a given video. Vid-LLMs typically use the approach of projecting visual tokens to LLMs' input space using projection layers or Q-Formers. However, while such models show promise in descriptive questions and instructions, they lack other capabilities.

One important missing piece in Video LLMs is temporal localization: when prompted with "when?" questions, existing models cannot accurately localize time periods and often hallucinate irrelevant information. Temporal localization is, however, an important feature that differentiates videos from images, and it has been widely studied outside the context of instruction-following LLMs. While temporal localization capabilities are crucial for Vid-LLMs, there are three key aspects that limit temporal localization capabilities of conventional Vid-LLMs: (i) time representation, (ii) architecture, and (iii) data.

First, existing models often represent timestamps as plain text (e.g. 01:22 or 142 sec). However, given a set of frames, the correct timestamp still depends on the frame rate, which the model does not have access to. This makes learning temporal localization harder. Second, the architecture of existing Video LLMs might not have sufficient temporal resolution to interpolate time information accurately. For example, Video-LLaMA only uniformly samples 8 frames from the entire video, which is insufficient for accurate temporal localization. Third, temporal localization is largely ignored in the data used by existing Video LLMs. Data with timestamps are only a small subset of video instruction tuning data, and the accuracy of these timestamps is also not verified.

SUMMARY

Embodiments of the present disclosure relate to language instructed temporal localization in videos. Systems and methods are disclosed that address temporal localization in videos using LLMs. In contrast to conventional systems, such as those described above, models according to the present disclosure are designed to answer "when?" questions, while simultaneously improving other relevant Vid-LLM capabilities.

Three key issues that limit conventional models' temporal localization capabilities: (i) time representation, (ii) architecture, and (iii) data. These shortcomings are addressed with the following features. First, introduction of time tokens that encode timestamps relative to the video length to better represent time in videos. Second, introduction of SlowFast tokens in the architecture to capture temporal information at fine temporal resolution. Third, a new task, Reasoning Temporal Localization (RTL), along with the benchmark, ActivityNet-RTL, are introduced for training and evaluating this task. Reasoning temporal localization assesses both the reasoning and temporal localization of Video LLMs. This addresses the much needed training and evaluation data for temporal localization using Video LLMs.

In embodiments, the systems and methods include encoding video frames into visual tokens, processing the visual tokens by a fast token pathway to produce fast visual tokens, and sampling the visual tokens by a slow token pathway to produce slow visual tokens. An LLM processes the fast and slow visual tokens and additionally processes language tokens to predict a caption corresponding to content in the video frames that is responsive to the language tokens. The LLM is trained using reasoning temporal localization (RTL) tasks.

BRIEF DESCRIPTION OF THE DRAWINGS

The present systems and methods for language instructed temporal localization in videos are described in detail below with reference to the attached drawing figures, wherein:

FIGS. 1F through 1H provide examples of RTL queries and answers provided by different Vid-LLMs during an evaluation of a LITA model according to an embodiment of the present disclosure;

FIGS. 2A and 2B provide results of an evaluation of a LITA model according to an embodiment of the present disclosure as compared with previous Vid-LLMs;

FIG. 2C provides results of an evaluation of different combinations of training tasks for a Vid-LLM architecture according to an embodiment of the present disclosure;

FIG. 7 illustrates a deep learning application processor, according to at least one embodiment.

DETAILED DESCRIPTION

Figure 1A:
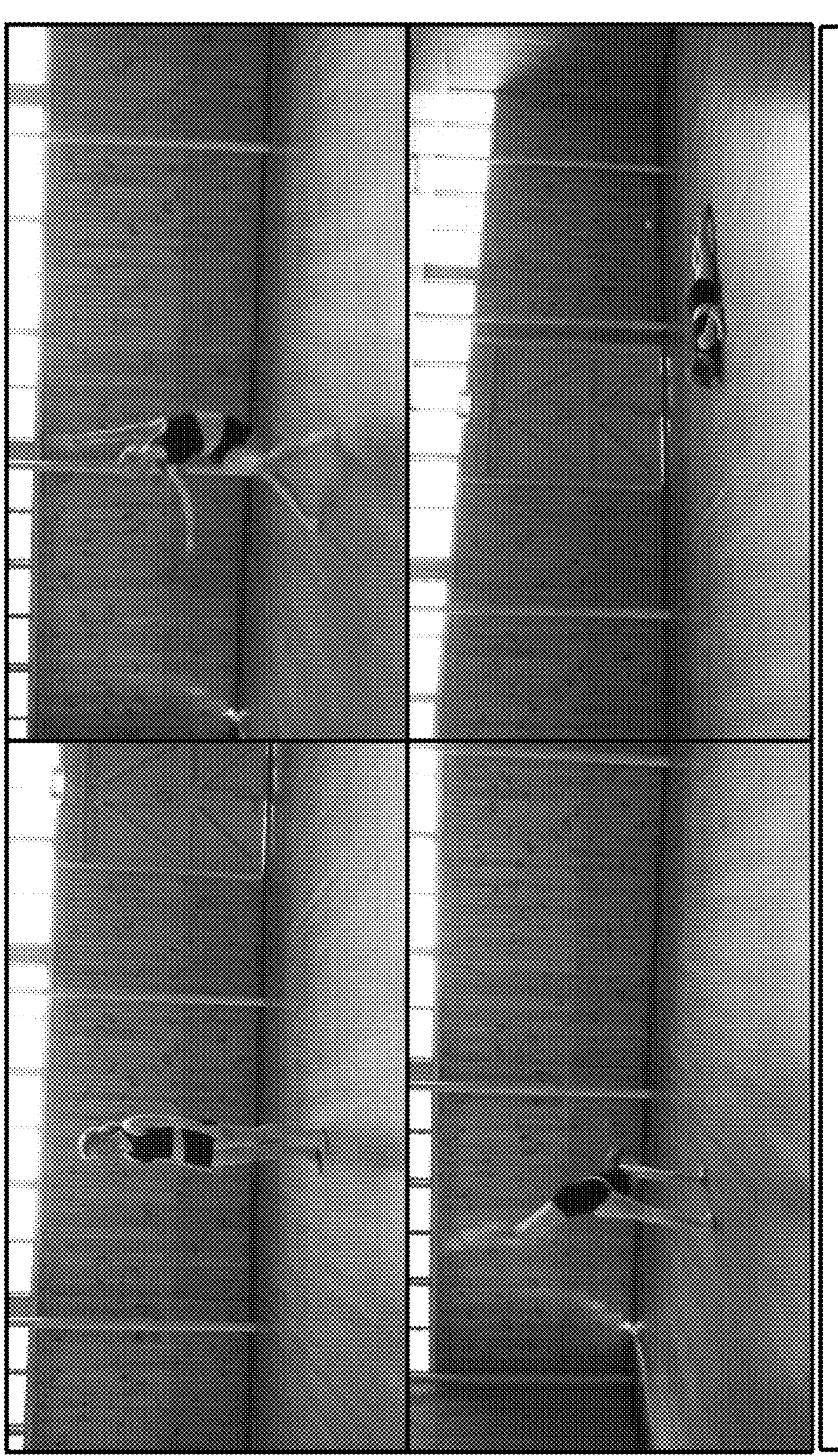
FIG. 1A provides an example of input, including a reasoning temporal localization (RTL) query, for a Vid-LLM model and an example output provided by the Vid-LLM model.

Aspects of the present disclosure provide systems and methods that provide enhanced temporal localization capabilities as compared with existing Vid-LLMs. First, aspects of the present disclosure introduce time tokens to represent relative timestamps and to allow Vid-LLMs to better communicate time-related information (as compared to using plain text). In particular, aspects of the present disclosure use relative representation for time (e.g. first 10% of the video) instead of an absolute time representation with plain text (e.g. 01:22). In at least one embodiment, for example, a given video is divided into T equal length chunks, and T time tokens <1> to <T> are introduced to represent the relative time location in the video. During training and inference, these time tokens can be easily encoded and decoded from plain text timestamps given the length of the video. The start and end timestamps are well-defined by the time tokens given only the input video. This is in contrast to plain text timestamps. Without the frame rate, the correct absolute timestamp is ill-defined given just the video frames.

Second, aspects of the present disclosure introduce Slow Fast tokens to capture temporal information at fine temporal resolution to enable accurate temporal localization. In particular, aspects of the present disclosure use densely sampled input frames from videos. It is unlikely that accurate temporal localization will be achieved with only sparsely sampled frames. However, there are challenges inherent in the use of densely sample input frames.

One challenge is that the LLM module inside Vid-LLMs cannot naively process large numbers of frames simultaneously due to context length limitations. To illustrate such challenge, consider, for example, Large Language and Vision Assistant (LLaVA), a multimodal model that combines a vision encoder language model for general-purpose visual and language understanding tasks. The vision encoder allows LLaVA to process and understand images, while the language model component enables it to comprehend and generate text related to those images. LLaVA converts each image to 256 tokens, which are fed into its LLM module as input. However, if a video (instead of a single image) with 100 frames is directly fed to an LLM module, then converting each image to 256 tokens would result in 256×100=25600 tokens being fed to the LLM. However, 25600 tokens exceeds the maximum context length for many LLMs.

Aspects of the present disclosure address this efficiency issue by considering two types of tokens: fast tokens and slow tokens. Specifically, aspects of the present disclosure generate fast tokens at a high temporal resolution to provide temporal information while simultaneously generating slow tokens at a low temporal resolution to provide spatial information. In this manner, the model uses a low number of tokens per frame for temporal information (fast tokens) and simultaneously uses a high number of tokens per frame for spatial information (slow tokens).

Third, aspects of the present disclosure perform a new task, Reasoning Temporal Localization (RTL), and learn to perform the new task with a training dataset, e.g. ActivityNet-RTL. In particular, aspects of the present disclosure include promoting accurate temporal localization via the use of human annotated timestamps. In addition to leveraging existing data and tasks, a new task, Reasoning Temporal Localization (RTL), is proposed, along with the dataset, ActivityNet-RTL, for training and evaluating this task. Answers to RTL questions can only be derived by utilizing world knowledge and temporal reasoning.

According to an aspect of the present disclosure, a computer-implemented method for language instructed temporal localization in video is provided. The method includes receiving multimodal input comprising video input and natural language input. The method further includes pre-processing the video input in a video pre-processing pathway to generate a plurality of fast tokens and a plurality of slow tokens. Each of the plurality of fast tokens represents a relative timestamp in the video. The method also includes pre-processing the natural language input in a language pre-processing pathway to generate a plurality of language tokens. The method additionally includes providing, to a pre-trained multimodal large language model (LLM), the plurality of visual tokens and the plurality of language tokens, and processing, by the pre-trained multimodal LLM, the plurality of fast tokens, the plurality of slow tokens, and the plurality of language tokens to generate output responsive to the natural language input. The output includes a natural language caption corresponding to content in the video.

In at least one embodiment of the method according to the first aspect of the present disclosure, the pre-trained multimodal LLM is pre-trained on a reasoning temporal localization (RTL) task.

In at least one embodiment of the method according to the first aspect of the present disclosure, the output further comprises an absolute timestamp.

In at least one embodiment of the method according to the first aspect of the present disclosure, the pre-trained multimodal LLM is pre-trained on the RTL task with an RTL training dataset. The RTL training dataset includes a plurality of query: answer pairs. Each respective answer of each respective query: answer pair includes an absolute timestamp and a natural language caption responsive to the corresponding query.

In at least one embodiment of the method according to the first aspect of the present disclosure, the pre-trained multimodal LLM is further pre-trained on at least one of: a dense video captioning task, an event localization task, a video question answering task, and/or a natural language visual question answering task.

In at least one embodiment of the method according to the first aspect of the present disclosure, the pre-processing the video input in the video pre-processing pathway includes dividing the video into a plurality of equal length segments, providing a frame for each respective segment, and generating, for each respective frame, a respective fast token of the plurality of fast tokens.

In at least one embodiment of the method according to the first aspect of the present disclosure, the pre-processing the video input in the video pre-processing pathway also includes sparsely sampling the plurality of frames to select a plurality of spatial information frames, downsampling the plurality of spatial information frames to provide a plurality of downsampled spatial information frames, and generating, for the plurality of downsampled spatial information frames, the plurality of slow tokens.

In at least one embodiment of the method according to the first aspect of the present disclosure, the number of the plurality of equal length segments is T, and the pre-processing the video input in the video-preprocessing pathway further includes, after the dividing the video into the plurality of equal length segments and providing a frame for each respective segment, generating M visual tokens for each respective frame. The generating the respective fast token for each respective frame comprises averaging the M visual tokens generated for the respective frame to generate the respective fast token, and the sparsely sampling the plurality of frames to select a plurality of spatial information frames comprises selecting s spatial information frames. The downsampling the plurality of spatial information frames is performed using an s×s spatial average pooling, and the generating, for the plurality of downsampled spatial information frames, the plurality of slow tokens involves generating a total of $M=M/s^2 \times s^2$ slow tokens.

In at least one embodiment of the method according to the first aspect of the present disclosure, $T>2$ and $s^2<M$.

According to a second aspect of the present disclosure, a system is provided. The system includes a memory and processing circuitry connected to the memory. The processing circuitry is configured to receive multimodal input comprising video input and natural language input and pre-process the video input in a video pre-processing pathway to generate a plurality of fast tokens and a plurality of slow tokens. Each of the plurality of fast tokens represents a relative timestamp in the video. The processing circuitry is further configured to pre-process the natural language input in a language pre-processing pathway to generate a plurality of language tokens, provide, to a pre-trained multimodal large language model (LLM), the plurality of visual tokens and the plurality of language tokens, and process, by the pre-trained multimodal LLM, the plurality of fast tokens, the plurality of slow tokens, and the plurality of language tokens to generate output responsive to the natural language input. The output includes a natural language caption corresponding to content in the video.

Various embodiments of the system according to the second aspect of the present disclosure provide the same features, previously described, of the various embodiments of the method according to the first aspect.

According to a third aspect of the present disclosure, a non-transitory computer-readable media is provided storing computer instructions that, when executed by processing circuitry, cause the processing circuitry to perform a method for language instructed temporal localization in video. The method includes receiving multimodal input comprising video input and natural language input. The method further includes pre-processing the video input in a video pre-processing pathway to generate a plurality of fast tokens and a plurality of slow tokens. Each of the plurality of fast tokens represents a relative timestamp in the video. The method also includes pre-processing the natural language input in a language pre-processing pathway to generate a plurality of language tokens. The method additionally includes providing, to a pre-trained multimodal large language model (LLM), the plurality of visual tokens and the plurality of language tokens, and processing, by the pre-trained multimodal LLM, the plurality of fast tokens, the plurality of slow tokens, and the plurality of language tokens to generate output responsive to the natural language input. The output includes a natural language caption corresponding to content in the video.

Various embodiments of the computer-readable media according to the third aspect of the present disclosure provide the same features, previously described, of the various embodiments of the method according to the first aspect and the system according to the second aspect.

According to a fourth aspect of the present disclosure, a computer-implemented method is provided for training a multimodal large language model (LLM) to perform language instructed temporal localization in video. The method includes providing a reasoning temporal localization (RTL) training dataset. The RTL training dataset includes a set of videos and a collection of query: answer pairs. The collection of query: answer pairs includes, for each video, at least one respective query: answer pair, each of which includes a query including language input that requires temporal reasoning and an answer including an absolute timestamp and a natural language caption responsive to the corresponding query. The method further includes training a multimodal LLM using the RTL training dataset. The training the multimodal LLM using the RTL training dataset includes providing, to the multimodal LLM for each combination of a video and a corresponding query: answer pair, a plurality of fast tokens, a plurality of slow tokens, and a plurality of language tokens. The plurality of fast tokens and the plurality of slow tokens are generated by pre-processing the video input in a video pre-processing pathway. Each of the plurality of fast tokens represents a relative timestamp in the video. The plurality of language tokens are generated by pre-processing the natural language input in a language pre-processing pathway to generate a plurality of language tokens.

In at least one embodiment of the method according to the fourth aspect of the present disclosure, the training the multimodal LLM using the RTL training dataset further comprises performing, for each respective query: answer pair, a loss calculation using a loss function. The loss calculation measures a difference between output provided by the multimodal LLM and the respective answer of the respective query: answer pair.

In at least one embodiment of the method according to the fourth aspect of the present disclosure, the loss calculation includes a timestamp component and a textual component. The timestamp component measures a difference between an absolute timestamp output by the multimodal LLM and the absolute timestamp of the respective answer, and the textual component measures a difference between a caption output by the multimodal LLM and the caption of the respective answer.

In at least one embodiment of the method according to the fourth aspect of the present disclosure, the method further includes calculating, via backpropagation, gradients of the loss function using results of the loss calculation, and updating, using the calculated gradients and an optimization algorithm, parameters of the multimodal LLM.

In at least one embodiment of the method according to the fourth aspect of the present disclosure, the method further includes training the multimodal LLM using at least one of: a dense video captioning task training dataset, an event localization task training dataset, a video question answering task training dataset, and/or a natural language visual question answering task training dataset.

In at least one embodiment of the method according to the fourth aspect of the present disclosure, the pre-processing the video input in the video pre-processing pathway includes dividing the video into a plurality of equal length segments and providing a frame for each respective segment, and generating, for each respective frame, a respective fast token of the plurality of fast tokens.

In at least one embodiment of the method according to the fourth aspect of the present disclosure, the pre-processing the video input in the video pre-processing pathway further includes sparsely sampling the plurality of frames to select a plurality of spatial information frames, downsampling the plurality of spatial information frames to provide a plurality of downsampled spatial information frames, and generating, for the plurality of downsampled spatial information frames, the plurality of slow tokens.

In at least one embodiment of the method according to the fourth aspect of the present disclosure, the number of the plurality of equal length segments is T, and the pre-processing the video input in the video-preprocessing pathway further includes, after the dividing the video into the plurality of equal length segments and providing a frame for each respective segment, generating M visual tokens for each respective frame. The generating the respective fast token for each respective frame includes averaging the M visual tokens generated for the respective frame to generate the respective fast token. The sparsely sampling the plurality of frames to select a plurality of spatial information frames includes selecting s spatial information frames. The downsampling the plurality of spatial information frames is performed using an $s \times s$ spatial average pooling, and the generating, for the plurality of downsampled spatial information frames, the plurality of slow tokens includes generating a total of $M = M/s^2 \times s^2$ slow tokens.

In at least one embodiment of the method according to the fourth aspect of the present disclosure, $T > 2$ and $s^2 < M$.

According to a fifth aspect of the present disclosure, a system is provided that includes a memory and processing circuitry. The memory stores a reasoning temporal localization (RTL) training dataset. The RTL training dataset includes a set of videos and a collection of query: answer pairs. The collection of query: answer pairs includes, for each video, at least one respective query: answer pair. Each respective query: answer pair includes a query including language input that requires temporal reasoning and an answer including an absolute timestamp and a natural language caption responsive to the corresponding query. The processing circuitry connected to the memory is configured to train a multimodal LLM using the RTL training dataset. The training the multimodal LLM using the RTL training dataset includes providing, to the multimodal LLM for each combination of a video and a corresponding query: answer pair, a plurality of fast tokens, a plurality of slow tokens, and a plurality of language tokens. The plurality of fast tokens and the plurality of slow tokens are generated by pre-processing the video input in a video pre-processing pathway. Each of the plurality of fast tokens represents a relative timestamp in the video. The plurality of language tokens are generated by pre-processing the natural language input in a language pre-processing pathway to generate a plurality of language tokens.

Various embodiments of the system according to the fifth aspect of the present disclosure provide the same features, previously described, of the various embodiments of the method according to the fourth aspect.

According to a sixth aspect of the present disclosure, a non-transitory computer-readable media is provided that stores computer instructions that, when executed by processing circuitry, cause the processing circuitry to perform a method for training a multimodal large language model (LLM) to perform language instructed temporal localization in video. The method includes providing a reasoning temporal localization (RTL) training dataset. The RTL training dataset includes a set of videos and a collection of query: answer pairs. The collection of query: answer pairs includes, for each video, at least one respective query: answer pair, each of which includes a query including language input that requires temporal reasoning and an answer including an absolute timestamp and a natural language caption responsive to the corresponding query. The method further includes training a multimodal LLM using the RTL training dataset. The training the multimodal LLM using the RTL training dataset includes providing, to the multimodal LLM for each combination of a video and a corresponding query: answer pair, a plurality of fast tokens, a plurality of slow tokens, and a plurality of language tokens. The plurality of fast tokens and the plurality of slow tokens are generated by pre-processing the video input in a video pre-processing pathway. Each of the plurality of fast tokens represents a relative timestamp in the video. The plurality of language tokens are generated by pre-processing the natural language input in a language pre-processing pathway to generate a plurality of language tokens.

Various embodiments of the computer-readable media according to the sixth aspect of the present disclosure provide the same features, previously described, of the various embodiments of the method according to the fourth aspect and the system according to the fifth aspect.

FIG. 1A illustrates an example of Reasoning Temporal Localization. Instead of directly querying about an event, questions in RTL require further reasoning to answer. For example, to answer the question "when does the woman's dance become the most energetic in the video?," the model needs to first recognize the woman's dance moves in the video, then reason about the most active part, and finally temporally localize the relevant event (i.e. the handspring). The model needs to compare all activities in the video to find the timestamps of the most energetic activity (i.e., handspring). In addition to the predicted timestamps, the explanation provided by the model is further considered. Thus, RTL not only assesses temporal understanding but also requires strong reasoning capabilities unique to LLMs.

For challenging RTL tasks, a Language Instructed Temporal-Localization Assistant (LITA) model according to an embodiment of the present disclosure has achieved double the baseline performance for temporal metrics (mean intersection-over-union (mIOU), Precision@0.5) while simultaneously providing superior explanations. In addition to enabling accurate temporal localization, an emphasis on temporal understanding resulted in improved core Vid-LLM capabilities. The LITA model substantially improved on all scores in a benchmark for video-based question answering. Specifically, as compared to existing Vid-LLMs, the LITA model demonstrated a 22% relative improvement for Correctness of Information and a 36% relative improvement for Temporal Understanding. Therefore, the LITA model was able to address shortcomings of prior Vid-LLMs that result in a lack of temporal localization capabilities and to simultaneously improve downstream video tasks.

Language Instructed Temporal Localization

Aspects of the present disclosure enable temporal localization for Video LLMs by providing language instructed temporal localization (LITA) models that provide: (1) relative time representation with time tokens, (2) slow-fast tokens to capture temporal information at fine temporal resolution, and (3) multi-task training that includes accurate timestamps. The goal of temporal localization is to pinpoint activities within untrimmed video sequences on a temporal scale. Target activities can be, e.g., predefined action classes or events described by natural language. Video temporal understanding is also related to various video tasks, such as dense video captioning and action segmentation. Models for these temporal tasks can have quite different designs. One possible design is that illustrated in FIG. 1B, which provides an architecture of a LITA model according to an embodiment of the present disclosure.

Figure 1B:
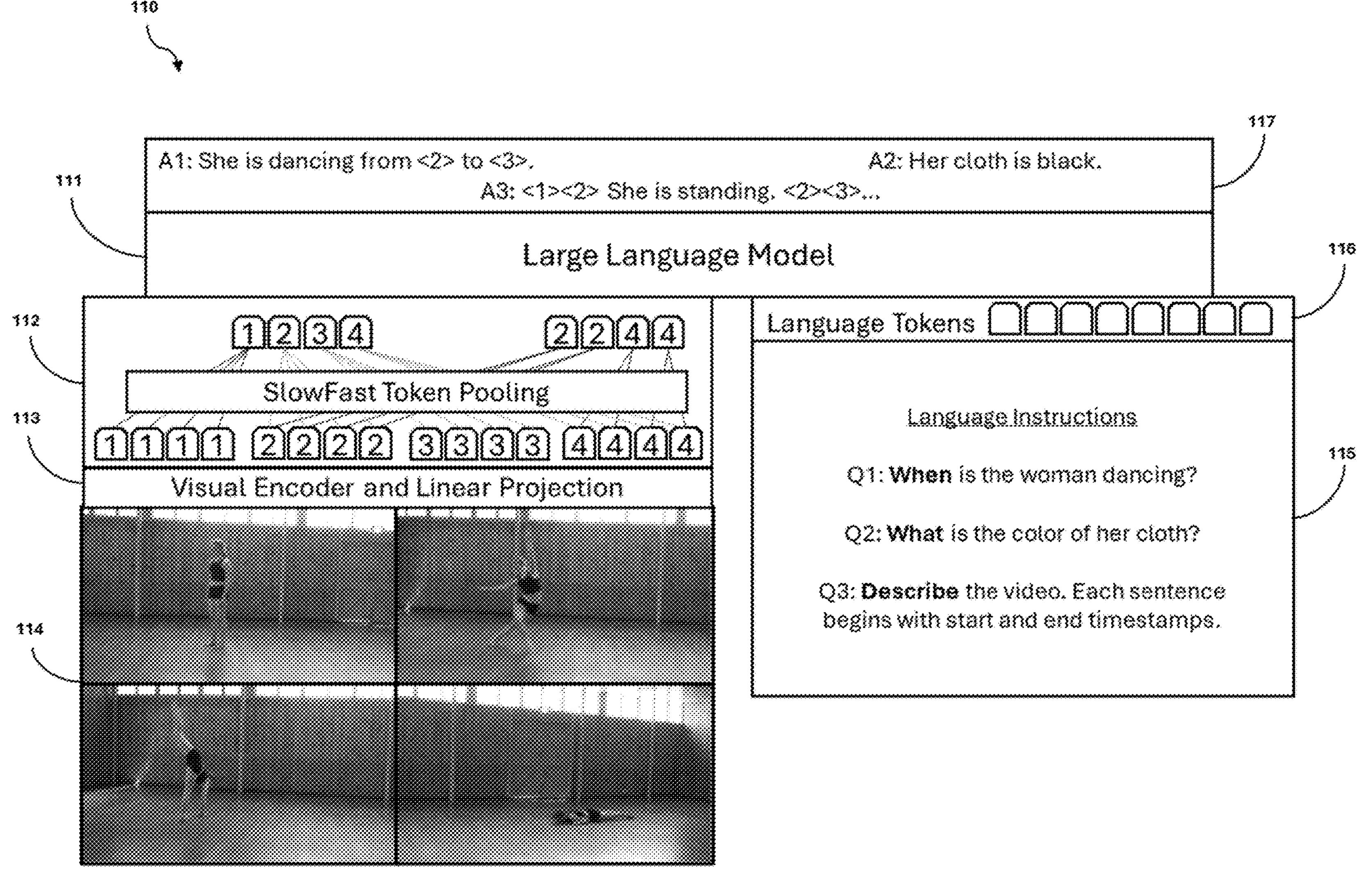
FIG. 1B illustrates an architecture of a language instructed temporal-localization assistant (LITA) model according to an embodiment of the present disclosure.

FIG. 1B illustrates the architecture of a LITA model 110 according to an embodiment of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the LITA model 110 is within the scope and spirit of embodiments of the present disclosure.

The LITA model includes a large language model (LLM) module 111, a SlowFast token pooling layer 112, and a visual encoder and linear projection layer 113. In FIG. 1B, a video 114 is provided as input to the visual encoder and linear projection layer 113 in order to be first encoded into visual tokens (numbered by frame). The visual tokens are further processed, in the SlowFast token pooling layer 112, via two pathways. A fast token pathway averages all the tokens in a frame to maintain a high temporal resolution. A slow token pathway sparsely samples frames to maintain a larger number of tokens per frame to provide spatial information. Timestamps are converted to time tokens <1> to <T>. This is important for better temporal localization learning. Various video tasks, expressed as natural language input 115 in the form of prompts Q1-3 on the right can be converted, by the LITA model, to natural language output 117 in the form of answers A1-3 to jointly optimize the LITA model. The natural language input 115 is encoded into language tokens 116.

The LITA model illustrated in FIG. 1B can utilize an image LLM for the LLM module 111. For example, LLaVA can be selected as the LLM module 111 due to its simplicity and effectiveness. However, the LITA architecture illustrated in FIG. 1B does not depend on the specific underlying Image LLM architecture and can, in alternative embodiments, be easily adapted to other base LLMs.

The LITA model is configured to receive the video 114 as input and to first, via the visual encoder and linear projection layer 113, uniformly select T frames and encode each frame into M tokens. T should be large enough to support the desired granularity of temporal localization. T×M would typically be a large number that the LLM module 111 is not capable of directly processing. Therefore, the LITA model is further configured to, via the SlowFast token pooling layer 112, use Slow-Fast pooling to reduce the T×M tokens to T+M tokens. The slow and fast tokens are projected by a linear layer and concatenated with text tokens to use as input to the LLM module 111. The text tokens (which are derived from input in the form of a natural language prompt) are processed to convert any referenced timestamps to specialized time tokens (<1> to <T>). All the input tokens (i.e. both visual and language tokens) are then jointly processed by the LLM module 111 sequentially. The entire LITA model is fine-tuned via reasoning temporal localization (RTL) data—as discussed herein-along with other video tasks, such as dense video captioning and event localization. The LITA model learns to use time tokens instead of absolute timestamps. For temporal localization, the LITA model can then respond to "when" questions (e.g. "When is she dancing?") with time tokens (e.g. "She is dancing from <2> to <3>."), which can then be converted to timestamps given the video length.

The LITA model uses a relative time representation instead of absolute timestamps. As shown in FIG. 1B, the LLM module 111 can only see the visual tokens (slow and fast) and the language tokens (text prompt). There is not enough information in this input space for the LLM module 111 to infer the absolute timestamp because the frame rate is not known to the model in advance. A better way is to represent timestamps relative to the video length, thus removing the dependency on the frame rate. The video is divided into T chunks and T specialized time tokens <1> to <T> are used for timestamps. Given a continuous timestamp t and video length L, $\tau$ can be easily converted to time token <t>, where $t=\text{round}(\tau(T-1)/L)+1$, and conversely <t> can be converted back to $\tau=L(t-1)/(T-1)$. While this does introduce discretization error, it greatly simplifies the time representation with LLMs. Relative timestamps are also used in other temporally heavy video tasks, such as dense video captioning.

Given the time representation utilized by the LITA model, many video tasks related to temporal localization can be transformed into language instructions and answers. For example, dense video captioning can be achieved by prompting the model with "Describe the video. Each sentence begins with start and end timestamps." (Q3 and A3 in FIG. 1B). Standard event localization is also transformed to "When does X happen?" (Q1 and A1 in FIG. 1B). Standard video question answering can also be incorporated (Q2 and A2 in FIG. 1B). More details are discussed herein below.

While time in videos can be discretized into T steps in order to make Video LLMs better at reasoning about time, the visual input should still match the temporal resolution T in order to achieve effective temporal processing. Ideally, at least T frames would be needed to temporally localize events with the resolution T. However, naively feeding all T frames into the LLM module 111 could be computationally prohibitive. For example, using T=100 and M=256 (CLIP VIT-L-14) would lead to 25600 tokens per video. To simultaneously provide both sufficient temporal resolution and sufficient visual resolution without requiring that a computationally prohibitive input be provided to the LLM module 111, the LITA model utilizes two pathways to pool the T×M tokens for T frames. The first pathway utilizes densely sampled fast tokens to provide temporal information. Specifically, the first pathway utilizes T fast tokens that are obtained from T frames by averaging all the tokens belonging to the same frame. The second pathway utilizes sparsely sampled slow tokens to maintain better spatial information. Specifically, the second pathway utilizes a spatial downsampling ratio of s and uniformly select $s^2$ frames from the video. For each selected frame, an s×s spatial average pooling to is performed to the M tokens, which leads to $M/s^2$ slow tokens per frame. This leads to a total $M=M/s^2 \times s^2$ slow tokens. In the evaluations described below, s=2 was used. This led to a total of T+M tokens to represent a video instead of T×M tokens.

In various embodiments of the LITA models, different values of T, M, and s can be utilized. The value of T can be selected based on the desired granularity of temporal localization. While T=1 corresponds to the trivial case where there is no time localization, there is, in principle, otherwise no limitation to the range of T. For example, if the goal is simply to understand whether an event happens at the beginning or end of a video, even T=2 is a valid choice. For large T, the limitation becomes insufficient data to learn the time token embeddings. Embodiments with T=1000 have been implemented with success and demonstrated good results.

The value of M can be selected based on the visual encoder (e.g. of the visual encoder and linear projection layer 113 of the LITA model illustrated in FIG. 1B). In principle, any vision encoder can be utilized. For example, the CLIP ViT-L-14 visual encoder has a frame resolution of 224 and a patch size of 14, which provides a total of (224/14)*(224/14)=256 tokens. Alternatively, a CLIP visual encoder with a frame resolution of 336 and a patch size of 14 corresponds to an M value of (336/14)*(336/14)=576.

The value of s has a lower bound of s=1 (which corresponds to no downsampling). While embodiments utilizing an s value of s=1 have been implemented and demonstrate good results, the maximum allowable context length of the LLM (e.g. the LLM 111 of the LITA model illustrated in FIG. 1B) can act as a limitation (e.g., there are, for the s=1 case, 4× as many slow tokens as compared to the s=2 case). The upper limit of s is determined by the number of patches in an image, and therefore, by the vision encoder. For example, for the CLIP ViT-L-14 visual encoder with a frame resolution of 224 and a patch size of 14, there are 256 patches. To have non-trivial slow tokens, s values of s<16 are required—otherwise, there is only a single token per frame for slow tokens, i.e. the same as for fast tokens. The maximum non-trivial s value for the CLIP ViT-L-14 visual encoder is therefore s=8, which provides (16/8)×(16/8)=2×2=4 slow tokens per frame. For a CLIP visual encoder with a frame resolution of 336 and a patch size of 14, there are 24×24=576 tokens, and the maximum non-trivial s value becomes s=12 because (24/12)×(24/12)=2×2=4.

In addition to the architecture of the LITA models, such as the LITA model illustrated in FIG. 1B, training tasks and training data also play an important role in the performance of the LITA models. According to embodiments of the present disclosure, LITA models are trained with the following five tasks, during which temporal localization data is emphasized: (1) dense video captioning, (2) event localization, (3) video question answering, (4) natural language visual question answering, and (5) reasoning temporal localization. Temporal localization is a crucial component for three out of the five tasks (1, 2, and 5). The first three tasks are standard video tasks and equip the LITA models with basic video understanding. The last two tasks improve the natural language conversation of the LITA models.

The first training task is dense video captioning. In dense video captioning, each video is described by a set of sentences, and each sentence comes with the start and end timestamps of the event. Each sentence in dense video captioning can thus be represented as: <start time><end time> SENTENCE. All sentences can be sorted by start time and directly concatenated along with the timestamps. One example prompt to the model for this task is: "Provide a detailed description of the given video. Each sentence should begin with the start and end timestamps."

The second training task is event localization. In event localization, the goal is to temporally localize the event described by a sentence. A simple answer format is used: <start time><end time>. One example prompt for this task is: "When does "SENTENCE" happen in the video? Answer the question only using start and end timestamps."

The third training task is video question answering. The question answering task is already represented as language instructions. However, answers in existing question answering datasets often consist of a single word or phrase because models for this task might not be able to generate longer text. To address this issue, the following prompt can be appended to the question: "Answer the question using a single word or phrase." The goal is to provide the context for short answers so that it affects the model's text generation less.

The fourth training task is natural language visual question answering. Training with the above three tasks provides the LITA models with video understanding capabilities. However, models trained with only these tasks often provide short answers and lack natural language conversation capabilities. To address this issue, the LITA models can be further trained with natural language visual question answering or visual instruction tuning datasets. The goal is to improve the natural language conversation of LITA. Mixing instruction tuning datasets with standard video tasks improves the LITA models' conversation quality while maintaining good video understanding.

The fifth training task is reasoning temporal localization, which is further described herein below. The LITA models are further trained to answer a reasoning temporal localization question, which consists of two parts: timestamps and explanation. It is challenging for models to simultaneously output both timestamps and explanations without any examples. Nevertheless, with some training data, the LITA models can pick up reasoning and temporal localization, and provide both the timestamps and explanation of their reasoning in answers.

Reasoning Temporal Localization

One impressive aspect of LLMs are their reasoning abilities: they can answer complex questions that involve multistep reasoning. However, standard temporal localization does not fully leverage that potential of Vid-LLMs. Reasoning Temporal Localization (RTL), on the other hand, can utilize both the temporal understanding and reasoning capabilities of Vid-LLMs.

In reasoning temporal localization, the query is still a "when" question that asks about the start and end timestamps of an event. The key difference compared to the standard temporal localization task is that the target event is not directly described in the question, and can only be inferred by reasoning and using world knowledge of the model. The answer to such a question thus consists of two parts: (1) the start and end timestamps of the target event, and (2) an explanation of the reasoning process the model goes through to derive the timestamps.

Figure 1C:
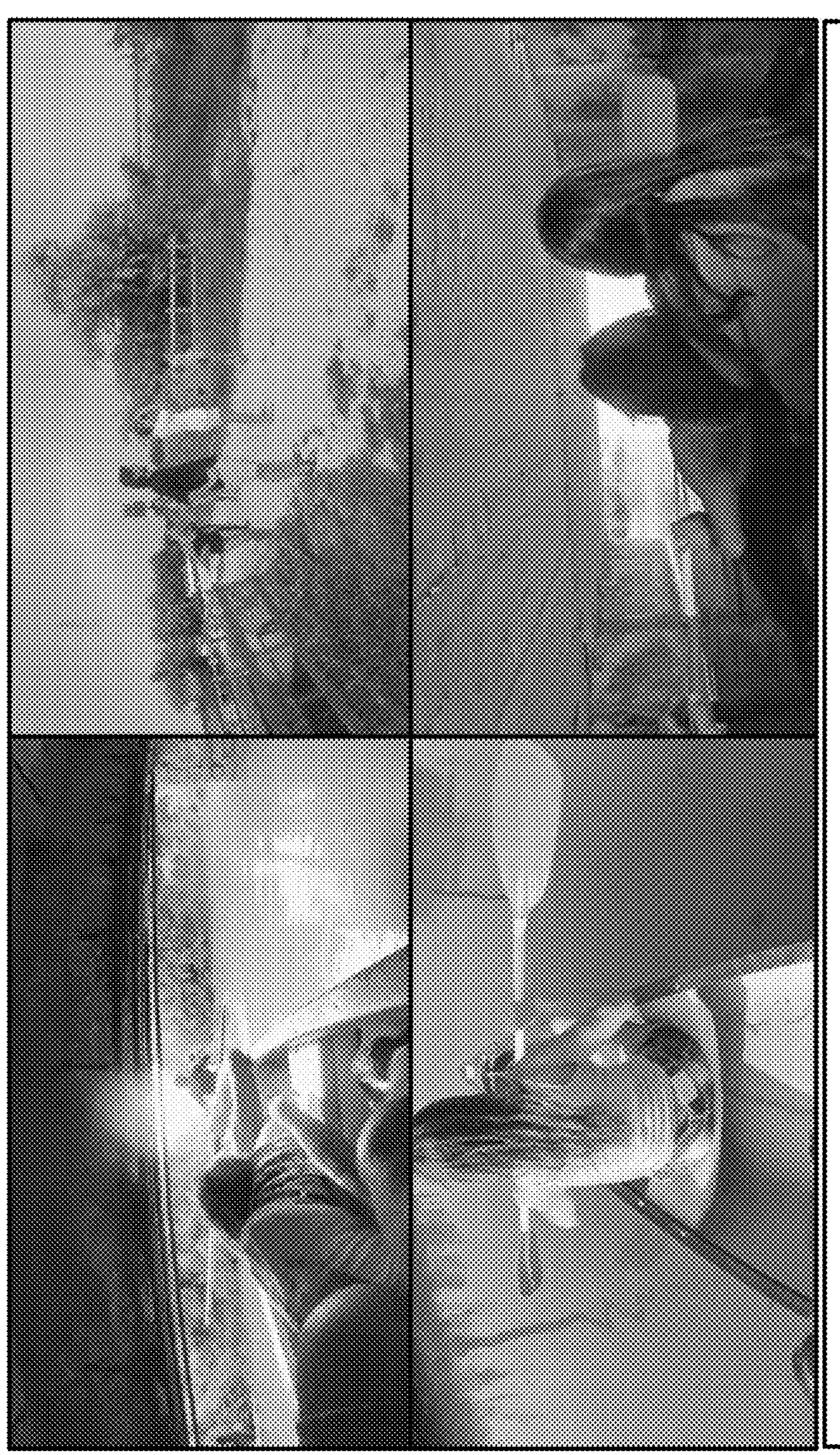
FIGS. 1C through 1E provides examples of reasoning temporal localization (RTL) query-answer pairs.
Figure 1D:
Figure 1E:
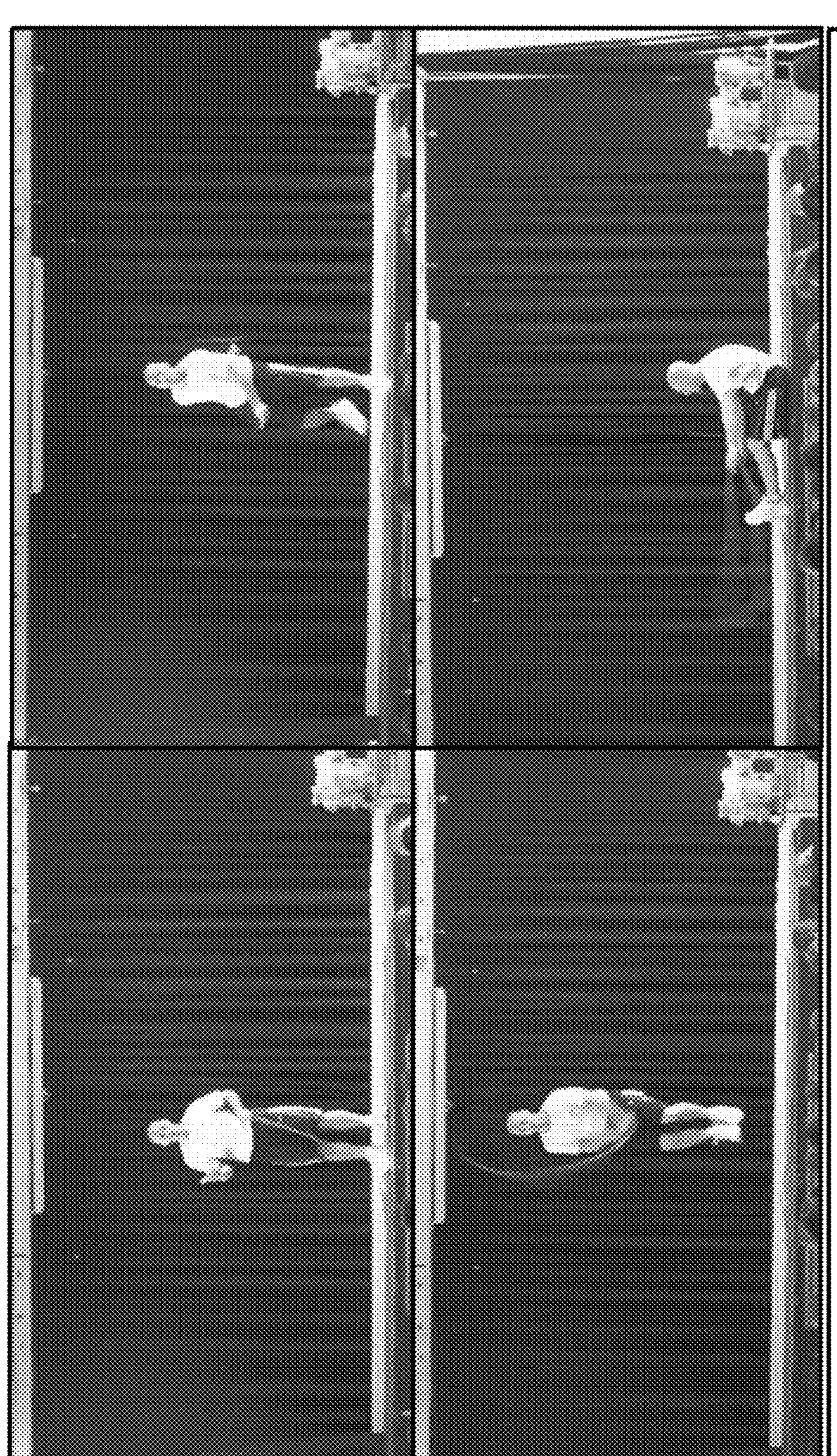

FIG. 1C through 1E illustrate examples of RTL queries to better illustrate the RTL task. The answer format to RTL queries is: [start end] Explanation. The examples are taken from an ActivityNet-RTL training dataset, which is described in more detail herein below. RTL questions ask about events that are not explicitly described, such that the model needs to utilize reasoning or worldly knowledge to answer. This is in contrast to standard temporal localization, which directly asks about an event of interest. In FIG. 1C, for example, providing an answer to the prompt requires the model to not only localize the event "adjust their position to avoid obstacles," but also to temporally reason about which instance happened earlier in the video. In FIG. 1D, instead of directly asking about "one-leg row," the query asks about an exercise targeting balance and stability. The model thus needs to utilize its knowledge of what kind of exercises are good for balance and stability. Finally, RTL queries can involve questions that require multi-step reasoning. In FIG. 1E, for example, the query asks about "the most atypical ways of jump roping," which requires the model to understand what is typical and atypical for jump roping, and then temporally find the most atypical time period. A standard temporal localization task, in contrast, would merely ask, e.g., "when does the man sit on the floor?"

In order to train a Vid-LLM using RTL, a training dataset is provided. According to embodiments of the present disclosure, a training dataset was generated using the ActivityNet Captions dataset, which annotates multiple events described by sentences in a video, and all the events are temporally localized with start and end timestamps. To generate the training dataset for RTL, the ActivityNet Captions dataset was provided as context to an LLM (specifically OpenAI's GPT-4) and the LLM was asked to generate temporal localization questions that require further reasoning to answer, i.e. RTL questions. The LLM was also asked to simultaneously generate an answer that includes the queried start and end timestamps, along with the explanation about the reasoning process. To improve the quality of the RTL questions that were generated, the LLM was provided with a small number of annotated examples, i.e. "few-shot" examples, to facilitate few-shot learning.

Consider the following example. The ActivityNet Captions dataset provides the following annotations for multiple events in a video, along with start and end timestamps.

[00:00-00:10] A woman is standing.

[00:12-00:30] The woman is dancing.

[00:32-00:36] The woman is sleeping.

For this example, one possible reasoning temporal localization question, seeing that the woman has done three activities, is to ask "when is the woman the least active?" Since sleeping is the least active out of the three activities, the target time period is 00:32-00:36, i.e. the period when she is sleeping. This illustrates how an LLM, such as GPT-4, can generate interesting questions for the RTL task from a standard temporal localization dataset without seeing the actual video. Few-shot examples for GPT-4 were also annotated as in previous works to improve the generation quality.

For the above described training set, generated from the ActivityNet Captions dataset using GPT-4, results were generated by GPT-4 with 10,009 videos from the training set of ActivityNet-Captions. This provided 33,557 RTL question-answer pairs forming the ActivityNet-RTL training set. Inspection of the GPT generated results revealed most of the questions to be valid temporal localization questions given the context. The main shortcoming was that not all question-answer pairs required reasoning. Instead, some of the questions that were generated asked directly about events that were already described in the dense video captions. However, because the LITA models are capable of answering standard temporal localization questions correctly using natural language, such questions can be permitted to remain in the training dataset.

Evaluation of Vid-Llms

In order to evaluate a LITA model according to an embodiment of the present disclosure, which was trained using the ActivityNet-RTL training set, an evaluation set was generated. The evaluation set was generated by pruning a set of RTL questions generated by an LLM (specifically GPT-4) using a subset of the ActivityNet-Captions evaluation set to manually remove non-reasoning questions. The time-stamps and explanations were also verified and modified as appropriate. The result was 229 question-answer pairs for 160 videos forming the ActivityNet-RTL evaluation set.

In evaluating the LITA model (specifically, the LITA model 110 illustrated in FIG. 1B, three metrics were considered: mIOU, Precision@0.5, and GPT-4 Relative Scores. The first two metrics are for temporal localization, and the third metric evaluates the explanation capability. mIOU averages the intersection-over-union (IOU) between predicted and groundtruth start and end timestamps. Precision@0.5 measures the percentage of predictions that have over 0.5 IOU. To evaluate the Vid-LLM trained using the ActivityNet-RTL training set, the first two metrics were first averaged on a per video basis, and then averaged over all videos in the evaluation set. This avoids overweighting videos and time periods with more questions, as some time periods correspond to multiple questions.

To evaluate the quality of the explanation, the evaluation pipeline of LLaVA was followed and an LLM (specifically, GPT-4) was leveraged for evaluation. Specifically, the LLM was asked to evaluate the helpfulness, relevance, accuracy, and level of details of the explanations, and then to provide a score from 1 to 10. The LLM was then asked to evauate both the predicted and groundtruth explanations, and to normalize the score for the prediction by the score of the groundtruth. For this metric, the scores were averaged over all question-answer pairs, as the explanations could be quite different even for questions about the same time period in the same video.

The LITA model was evaluated with both temporal localization and video tasks that do not involve temporal localization because most existing Vid-LLMs cannot handle temporal localization. In addition to RTL, the LITA model was further evaluated on Video-based Text Generation Performance Benchmarking. This provides a holistic evaluation of the LITA model as a Video LLM and not just for temporal localization.

Two variations of the LITA model (i.e. one incorporating a 7 billion (7B) parameter LLaVA model and one incorporating a 13 billion (13B) parameter LLaVA model) were configured to uniformly sample 100 frames from a video, and use 100 time tokens <1> to <100> to represent timestamps. CLIP-L-14 was used as the visual encoder, and Vicuna as the LLM module. A single linear layer was trained for projection. The variations of the LITA model were configured to use 4 frames for slow tokens and use average pool window s=2. With 1 fast token per frame, this provides a total of $$100 + \frac{256}{4} \times 4 = 356$$

tokens per video.

The variations of the LITA model were trained using the five tasks discussed above, i.e. dense video captioning, event localization, video question answering, natural language visual question answering, and reasoning temporal localization. For dense video captioning and event localization, the variations of the LITA model were trained using the training splits of ActivityNet-Captions and YouCook2, which combine to around 11 k videos. The event localization dataset can be generated from the dense video captioning dataset by using the caption as query and the timestamps as target. For video question answering, the variations of the LITA model were trained using NExT-QA, which contains complex questions. For image instruction tuning, the variations of the LITA model were trained using LLaVA-150K. For reasoning temporal localization, the variations of the LITA model were trained using the ActivityNet-RTL split, which, as described above, was built on the training split of ActivityNet-Captions.

To train the LITA model, 100K samples were randomly selected with replacement for each of the five tasks (total 500K). A batch size of 128 and a learning rate of 2e-5 were used to train for 4 k iterations. The training process required around 13 hours for 13B and 9 hours for 7B models using 8 A100 GPUs. The linear projection was initialized with the LLaVA pre-trained weights.

To evaluate the performance of the variations of the LITA model on the RTL task, their performance on the ActivityNet-RTL evaluation set was compared to that of other Vid-LLMs. Specifically, the performance of the variations of the LITA model was compared with the performance of Video-LLaMA-v2 and Video-ChatGPT, as measured by the three metrics previously discussed (i.e. mIOU, Precision@0.5, and GPT-4 Relative Scores). In this summary of the results of the evaluation, "P@0.5" is used for Precision@0.5 and "Score" is used for the for the GPT-Relative Scores. During the evaluation, it was observed that most of the outputs of Video-LLaMA-v2 and Video-ChatGPT omitted any timestamps, thus mIOU and Precision@0.5 become absolute. Therefore, for these methods only the "Score" metric was evaluated. In addition, the performance of the two variations of the LITA model was compared with the performance of the following model variations-both of which were trained with the same five training tasks as the LITA model:

- "Slow Tokens Only" samples 4 frames from the video, and computes 64 tokens per frame. It does not use the fast tokens, and it also does not use time tokens for relative timestamps. This can be seen as naively implementing a Video LLM via the LLaVA architecture.
- "SlowFast Tokens" additionally includes fast tokens (i.e. 1 token per frame) compared to "Slow Tokens Only". This improves the architectural design for representing video, and should allow better temporal processing.

The results of evaluating the various models on ActivityNet-RTL are shown in FIG. 2A. All metrics were averaged over three trials. As can be seen in the results provided in FIG. 2A, the two variations of the LITA model significantly outperformed all baselines for all metrics. The two variations of the LITA model provided almost double mIOU and P@0.5 when compared to "Slow Tokens Only", which is considered as a naive extension of Image LLMs to Video LLMs. Notably, the temporal localization accuracy also improved as the number of parameters of the LLaVA model that was incorporated into the LITA model variations increased from 7 billion to 13 billion. Therefore, while it might be assumed that scaling the model would merely improve language understanding, the results of the evaluation demonstrate that scaling can also improve temporal reasoning and understanding for Video LLMs. The "Score" metric, assisted by GPT-4, evaluated the quality of the explanation provided by the models. While GPT-4 was instructed to ignore the timestamps mentioned in the explanations, it was observed that the "Score" metric was still slightly affected by the timestamps. Nevertheless, the two variations of the LITA model provided better explanations for their reasoning due to an overall better video understanding.

Figure 1F:
Figure 1G:

Qualitative results evaluating the LITA model (i.e. the variation incorporating the 13B parameter LLaVA model) against Video-LLaMA-v2 are shown in FIGS. 1F through 1H. In FIG. 1F, the LITA model correctly localizes when the second arm wrestling happen while Video-LLaMA-v2 does not even recognize that there is arm wrestling in the video. In FIG. 1G, while both models identify that the correct activity is cooking with fire, the LITA model provides much more accurate details, including the fact that they are roasting marshmallows, and the start and end time for that activity. Finally, in FIG. 1H, the LITA model impressively recognizes the event where the girl "falls off the beam but gets back" and correctly responds that this shows resilience in her performance. In contrast, Video-LLaMA-v2 gives a generic answer given the "resilience" prompt.

To evaluate the performance of the LITA model (i.e. the variation incorporating the 13B parameter LLaVA model) on video tasks that do not involve temporal localization, i.e. on standard evaluation procedures for Video LLMs, the "Video-based Text Generation Performance Benchmarking" proposed by Maaz et al. was utilized. This benchmark selects videos from ActivityNet and annotates question/answer pairs with natural language. This is in contrast to existing video question answering benchmarks, where the answers are often limited to a single word or phrase. In this benchmark, there are specific questions like: "What kind of tricks is the man performing while skating?" or generic questions like "Can you describe the video in detail?" For evaluation, the benchmark uses GPT to measure the following aspects of Video LLMs' answers: correctness of information, detail orientation, contextual understanding, temporal understanding, and consistency.

Specifically, the performance of the LITA model was compared with the performance of LLaMA-Adapter, Video-LLaMA, VideoChat, and Video-ChatGPT. FIG. 2B illustrates the results of the evaluations. As can be seen in Figure Z, Video-ChatGPT slightly outperforms other baselines including Video-LLaMA-v2. However, the LITA model significantly outperforms these two existing Video LLMs in all aspects. In particular, the LITA model achieved a 22% improvement for Correctness of Information (2.94 vs. 2.40) and a 36% relative improvement for Temporal Understanding (2.68 vs. 1.98). The results of this analysis thereby demonstrate that the emphasis of temporal understanding in training can not only enable accurate temporal localization, but also improve the video understanding of the model being trained. It is hypothesized that temporal localization enables the model to learn more details about videos, leading to improved video understanding. A similar observation was made for Image LLMs, where joint training with grounding tasks also improved non-grounding text generation.

Evaluation of Training Tasks

To analyze the effect of various tasks used to train the LITA model, the five tasks described above (i.e. i.e. dense video captioning, event localization, video question answering, natural language visual question answering, and reasoning temporal localization) were split into three groups: RTL, Video, and NLVQA. "RTL" includes only the reasoning temporal localization. Without training on ActivityNet-RTL, the model would not output timestamps that enable evaluation of temporal localization in many cases. The second group "Video" includes all the standard video tasks: dense video captioning, event localization, and video question answering. Training the model using these video tasks enables it to learn an understanding of video. Finally, "NLVQA" refers to the natural language visual question answering task to improve the model's natural language conversation.

Figure 1I:
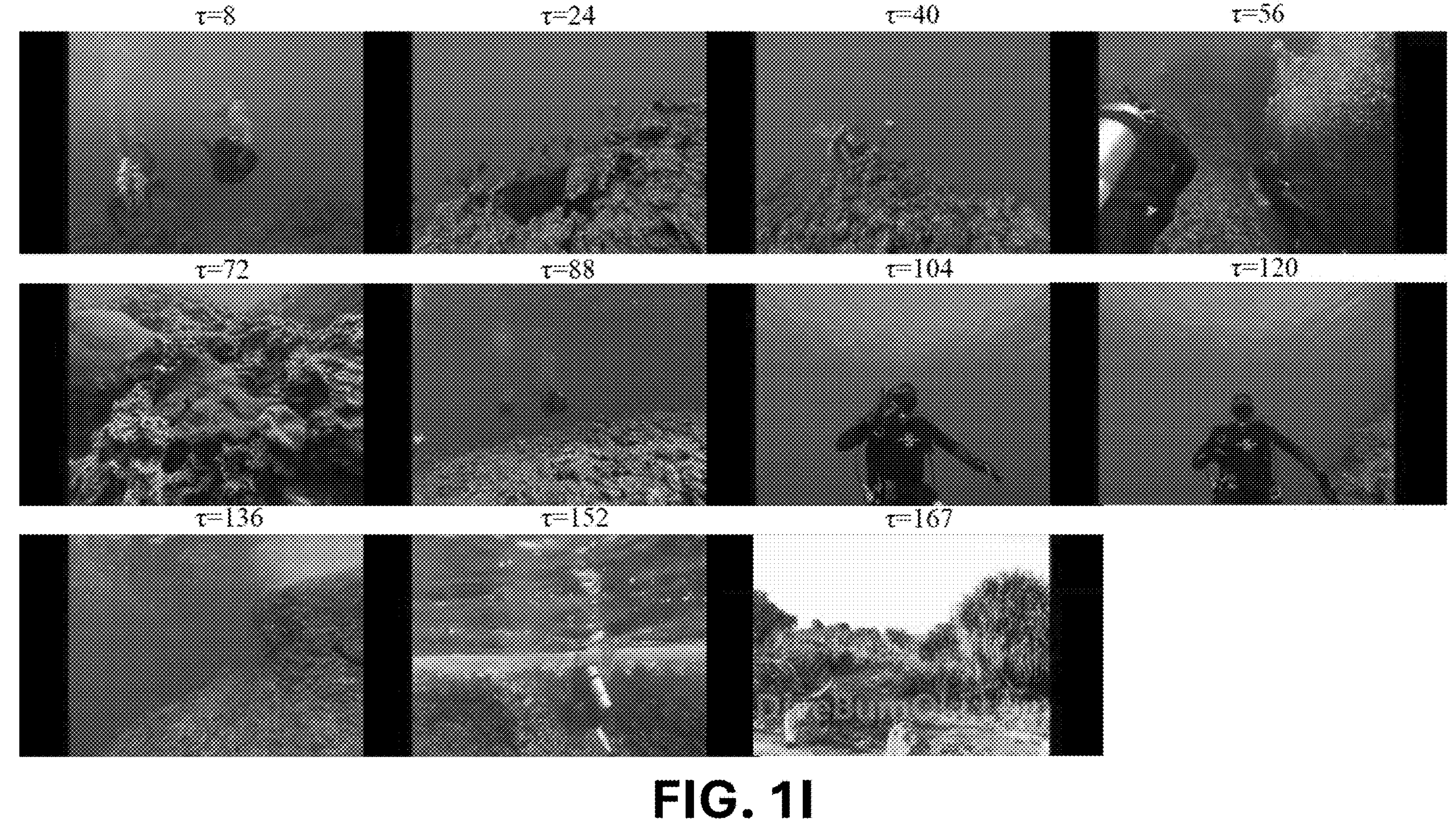
FIG. 1I provides examples of RTL queries and answers provided by a Vid-LLM architecture according to an embodiment of the present disclosure trained with different training tasks.

To evaluate the impact of the different types of training on model performance, LITA models having the architecture illustrated in FIG. 1B were trained as follows: "RTL Only," training with RTL but without Video and NLVQA, "No NLVQA," training with both RTL and Video but without NLVQ," and "LITA," training with all three and thus all tasks. Quantitative results of the model performance are provided in FIG. 2C, while qualitative comparisons of answers provided by the different models are provided in FIG. 11. In FIG. 1I, τ is the continuous time in seconds. The questions illustrated are not from ActivityNet-RTL, as questions beyond reasoning temporal localization questions are of interest. The "RTL Only" trained model answers in the format for reasoning temporal localization, as this is the only training data it has. The "No NLVQA" trained model further includes standard video tasks and can correctly answer non-temporal questions (Q1 and Q2). However, the answers are short due to the short answers in existing video question answering datasets. The fully-trained LITA model improves both reasoning and natural language conversation through training with NLVQA datasets.

An analysis of the results provided in FIG. 1I and FIG. 2C demonstrates that "RTL Only"-trained model does not have sufficient supervision to learn the task. This is reflected in both timestamp accuracy (P@0.5) and explanation quality (Score). In addition, for non-temporal questions (Q1 and Q2) in FIG. 1I, the model cannot properly answer and always uses the answer format for reasoning temporal localization. Adding standard video training tasks, i.e. to provide the "No NLVQA" model, improves all quantitative metrics compared to "RTL Only" and enables the model to correctly answer Q1 and Q2. However, this capability mainly comes from the inclusion of video question answering datasets, which leads to short answers. Adding the NLVQA training, which contains complex reasoning questions to improve reasoning capabilities, to provide the fully-trained LITA model further increases the quantitative metrics and, more importantly, enables the model to answer questions with natural language instead of short phrases.

The present disclosure provides Language Instructed Temporal-Localization Assistant (LITA) models, which enable accurate temporal localization using Video LLMs. LITA models demonstrate promising capabilities in answering complex temporal localization questions. At the same time, LITA models substantially improve video-based text generation compared to existing Video LLMs—even for non-temporal questions. This is the result of both the model design and data strategy utilized for the LITA models described herein. With respect to model design, the LITA models employ time tokens to better represent the time and Slow-Fast tokens to efficiently process video inputs. The importance of these model components has been demonstrated experimentally. With respect to data strategy, temporal localization data is emphasized in training the LITA models. To achieve this, the Reasoning Temporal Localization (RTL) task is utilized during training, e.g. using the ActivityNet-RTL training set curated as described herein. Experimental results demonstrate that the inclusion of temporal localization data during training not only enables temporal localization for Video LLMs, but also improves the general video understanding capabilities. In addition to RTL, the LITA models described herein are also training using standard video tasks and image instruction tuning data to further improve video understanding as well as reasoning and natural language generation capabilities.

Figure 3A:
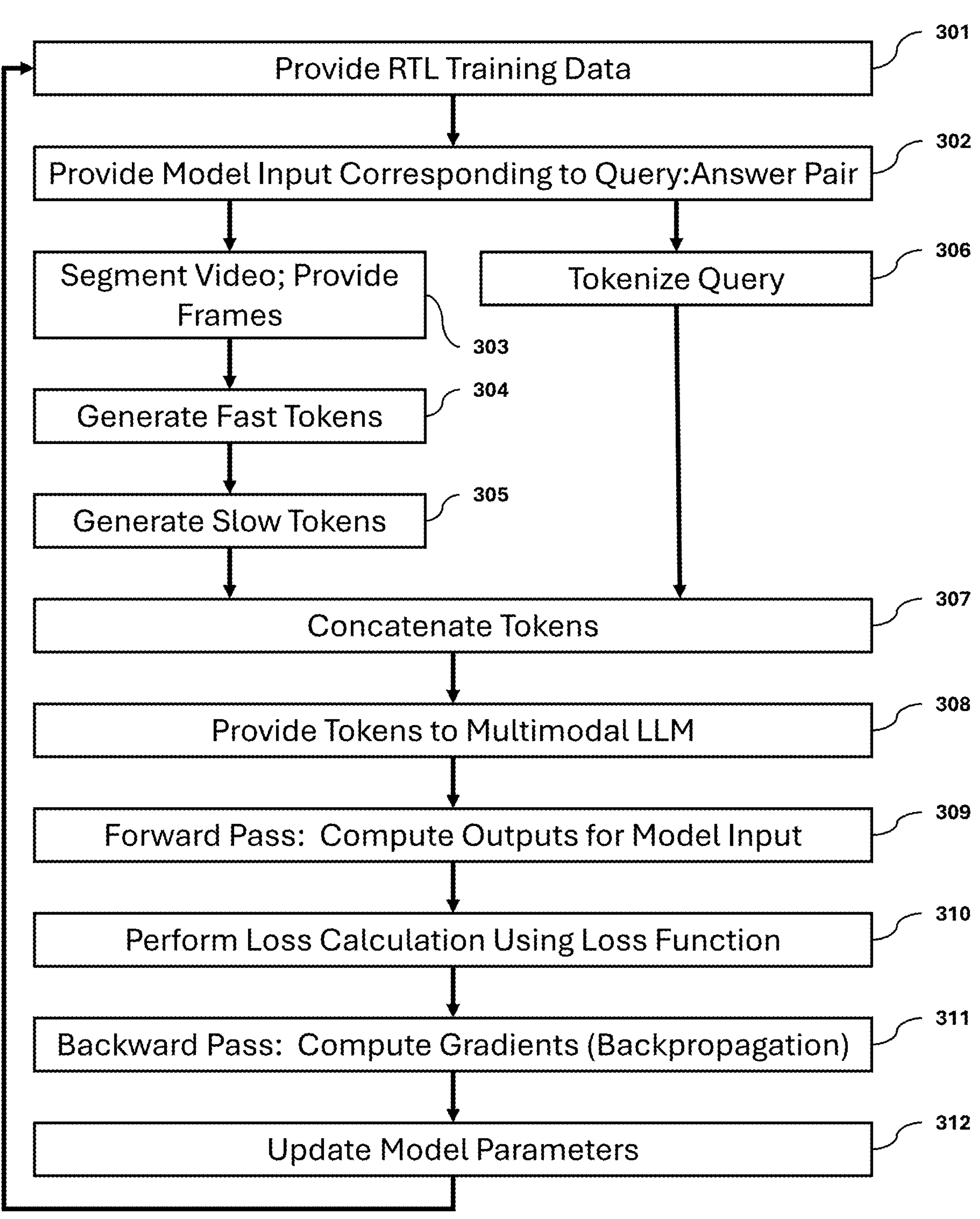
FIG. 3A provides a flow diagram illustrating a process for training a vid-LLM to perform language instructed temporal localization in videos.
Figure 3B:
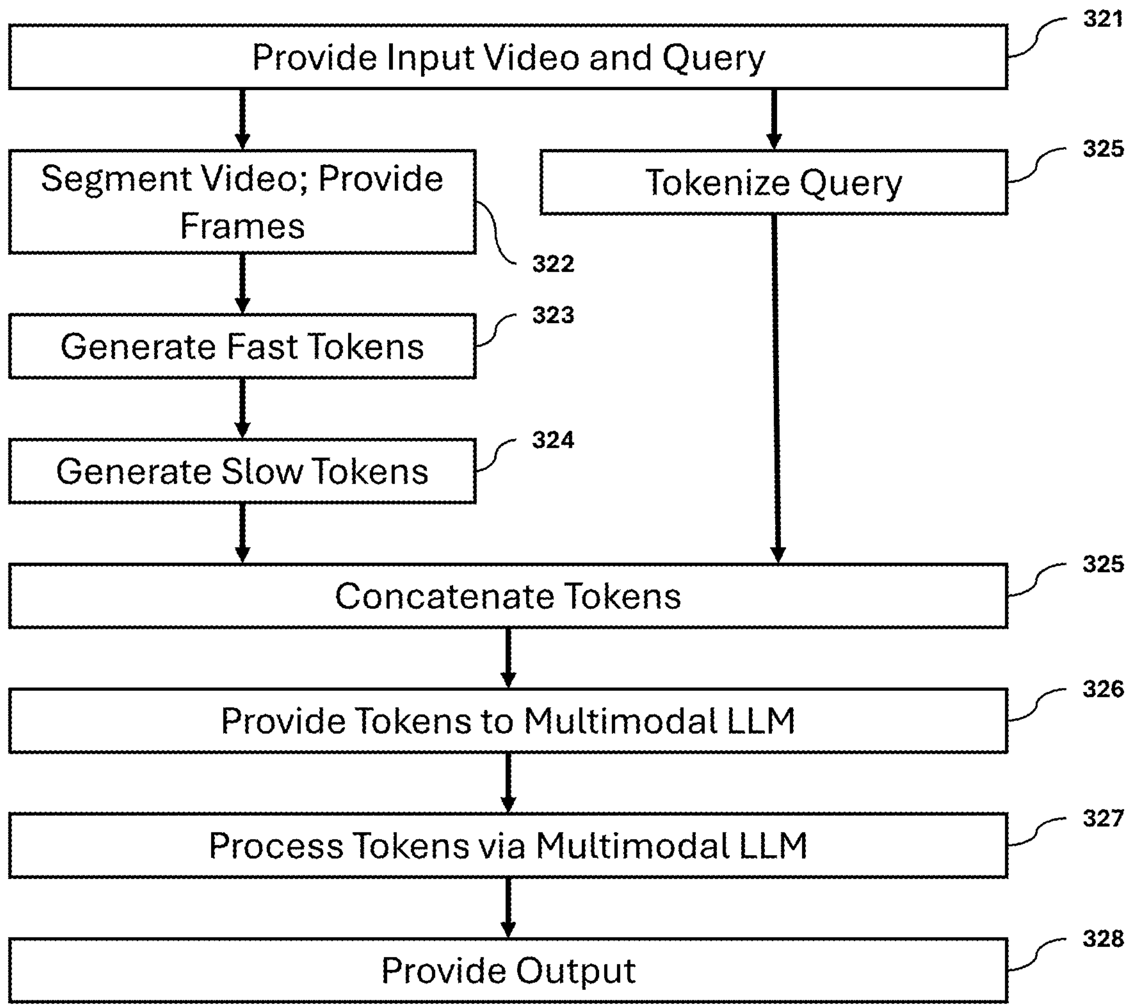
FIG. 3B provides a flow diagram illustrating a process for generating, via a vid-LLM, natural language output in response to multimodal input.

FIG. 3A provides a flow diagram of a process for training a vid-LLM to perform language instructed temporal localization in videos, in accordance with an embodiment, and FIG. 3B provides a flow diagram illustrating a process for generating, via a vid-LLM, natural language output in response to multimodal input. Each block of the processes of FIGS. 3A and 3B, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the processes of FIGS. 3A and 3B are described, by way of example, with respect to the system of FIG. 1B. However, these methods may additionally or alternatively be executed by any one system, or any combination of systems, including, but not limited to, those described herein. Furthermore, persons of ordinary skill in the art will understand that any system that performs the methods of FIGS. 3A and 3B is within the scope and spirit of embodiments of the present disclosure.

FIG. 3A provides a flow diagram illustrating a process 300 for training a vid-LLM to perform language instructed temporal localization in videos. The process 300 involves, at 301, providing RTL training data. In at least one embodiment, the RTL training data includes an RTL training dataset. In at least one embodiment, the RTL training dataset can includes a plurality of query: answer pairs, each query: answer pair corresponding to a video, each answer of a respective query: answer pair including an absolute timestamp and a natural language caption responsive to the corresponding query. In at least one embodiment, the RTL training dataset is the ActivityNet-RTL training dataset previously described.

The process 300 further involves providing model input at 302, the model input corresponding to one or more query: answer pairs. In at least one embodiment, the model input includes a video and a query of a query: answer pair corresponding to the video. In at least one embodiment, the queries involve questions that require multi-step reasoning and request temporal localization related to the multi-step reasoning.

At 303 through 305, the process 300 involves pre-processing, via an image pre-processing pathway, the video component of the model input. Specifically, at 303, the process segments the video into a plurality of equal sized chunks and provides a frame for each of the segments. Providing a frame for each respective segment can include, in at least one embodiment, averaging and/or sampling multiple frames of the original video that correspond to the respective segment. Alternatively, providing a frame for each respective segment can include, in at least one embodiment, selecting the single frame that has a one-to-one correspondence with the respective segment. In at least one embodiment, providing a frame for each respective segment includes providing T frames, each of the T frames corresponding to a relative timestamp.

The process further involves, at 304 and 305, generating fast tokens and generating slow tokens. In at least one embodiment, the fast tokens are generated via a first pathway and the slow tokens are generated via a second pathway. The first pathway utilizes densely sampled fast tokens to provide temporal information. In at least one embodiment, the first pathway utilizes T fast tokens that are obtained from the T frames by averaging all M visual tokens belonging to the same frame. In at least one embodiment, the second pathway utilizes sparsely sampled slow tokens to maintain better spatial information, e.g. by utilizing a spatial downsampling ratio of s and uniformly select $s^2$ frames from the video. For each selected frame, an s×s spatial average pooling to is performed to the M tokens, which leads to $M/s^2$ slow tokens per frame. This leads, in at least one embodiment, to a total $M=M/s^2 \times s^2$ slow tokens and a total of T+M tokens to represent a video instead of T×M tokens.

The process also involves, at 306, pre-processing the language component (i.e. the query) of the model input in a natural language pre-processing pathway. Pre-processing the language component of the model input involves tokenizing the query at 306 to provide a plurality of language tokens.

The process further involves, at 307, concatenating the plurality of fast tokens, the plurality of slow tokens, and the plurality of language tokens. At 308, the process provides the tokens to a multimodal LLM. In at least one embodiment, the multimodal LLM is an image LLM. In at least one embodiment, the multimodal LLM is the LLaVA LLM. In at least one embodiment, the multimodal LLM is based on a neural network architecture that includes at least one transformer model. In at least one embodiment, the at least one transformer model includes multiple layers of attention mechanisms and feedforward neural networks. At 309, the process performs a forward pass in which the multimodal LLM computes one or more outputs for each of the one or more model inputs. At 310, the process performs a loss calculation using a loss function. In at least one embodiment, the loss function is a cross-entropy loss function. In at least one alternative embodiment, the loss function is a mean squared error loss function. At 311, the process performs a backward pass in which gradients of the loss function with respect to each model parameter are computed. In at least one embodiment, the gradients include one or more of self-attention gradients, feedforward network gradients, layer normalization gradients, and residual connection gradients. At 312, the model parameters are updated. In at least one embodiment, the model parameters are updated using the gradients calculated at 311 and an optimization algorithm. In at least one embodiment, the optimization algorithm is a stochastic gradient descent (SGD) algorithm. In at least one embodiment, the optimization algorithm is the Adam optimizer.

Following 312, the process 300 may be repeated using the multimodal LLM with the updated model parameters resulting from the update at 312. In at least one embodiment, the process 300 returns to 301 where the same or additional RTL training data is used to perform a further training iteration.

FIG. 3B provides a flow diagram illustrating a process 320 for generating, via a vid-LLM, natural language output in response to multimodal input. The process 320 involves providing multimodal input, in the form of a video and a query, at 321. At 322 through 324, the process 320 involves pre-processing, via an image pre-processing pathway, the video component of the multimodal input input. Specifically, at 322, the process segments the video into a plurality of equal sized chunks and provides a frame for each of the segments. Providing a frame for each respective segment can include, in at least one embodiment, averaging and/or sampling multiple frames of the original video that correspond to the respective segment. Alternatively, providing a frame for each respective segment can include, in at least one embodiment, selecting the single frame that has a one-to-one correspondence with the respective segment. In at least one embodiment, providing a frame for each respective segment includes providing T frames, each of the T frames corresponding to a relative timestamp.

The process further involves, at 323 and 324, generating fast tokens and generating slow tokens. In at least one embodiment, the fast tokens are generated via a first pathway and the slow tokens are generated via a second pathway. The first pathway utilizes densely sampled fast tokens to provide temporal information. In at least one embodiment, the first pathway utilizes T fast tokens that are obtained from the T frames by averaging all M visual tokens belonging to the same frame. In at least one embodiment, the second pathway utilizes sparsely sampled slow tokens to maintain better spatial information, e.g. by utilizing a spatial downsampling ratio of s and uniformly select $s^2$ frames from the video. For each selected frame, an s×s spatial average pooling to is performed to the M tokens, which leads to $M/s^2$ slow tokens per frame. This leads, in at least one embodiment, to a total $M=M/s^2 \times s^2$ slow tokens and a total of T+M tokens to represent a video instead of T×M tokens.

The process also involves, at 325, pre-processing the language component of the multimodal input in a natural language pre-processing pathway. Pre-processing the language component of the multimodal input involves tokenizing the language component at 321 to provide a plurality of language tokens.

The process further involves, at 325, concatenating the plurality of fast tokens, the plurality of slow tokens, and the plurality of language tokens. At 326, the process provides the tokens to a multimodal LLM. In at least one embodiment, the multimodal LLM is an image LLM. In at least one embodiment, the multimodal LLM is the LLaVA LLM. In at least one embodiment, the multimodal LLM is based on a neural network architecture that includes at least one transformer model. In at least one embodiment, the at least one transformer model includes multiple layers of attention mechanisms and feedforward neural networks. At 327, the multimodal LLM computes, during inference, output that is responsive to the multimodal input. At 328, the process 320 provides the output.

Parallel Processing Architecture

Figure 4:
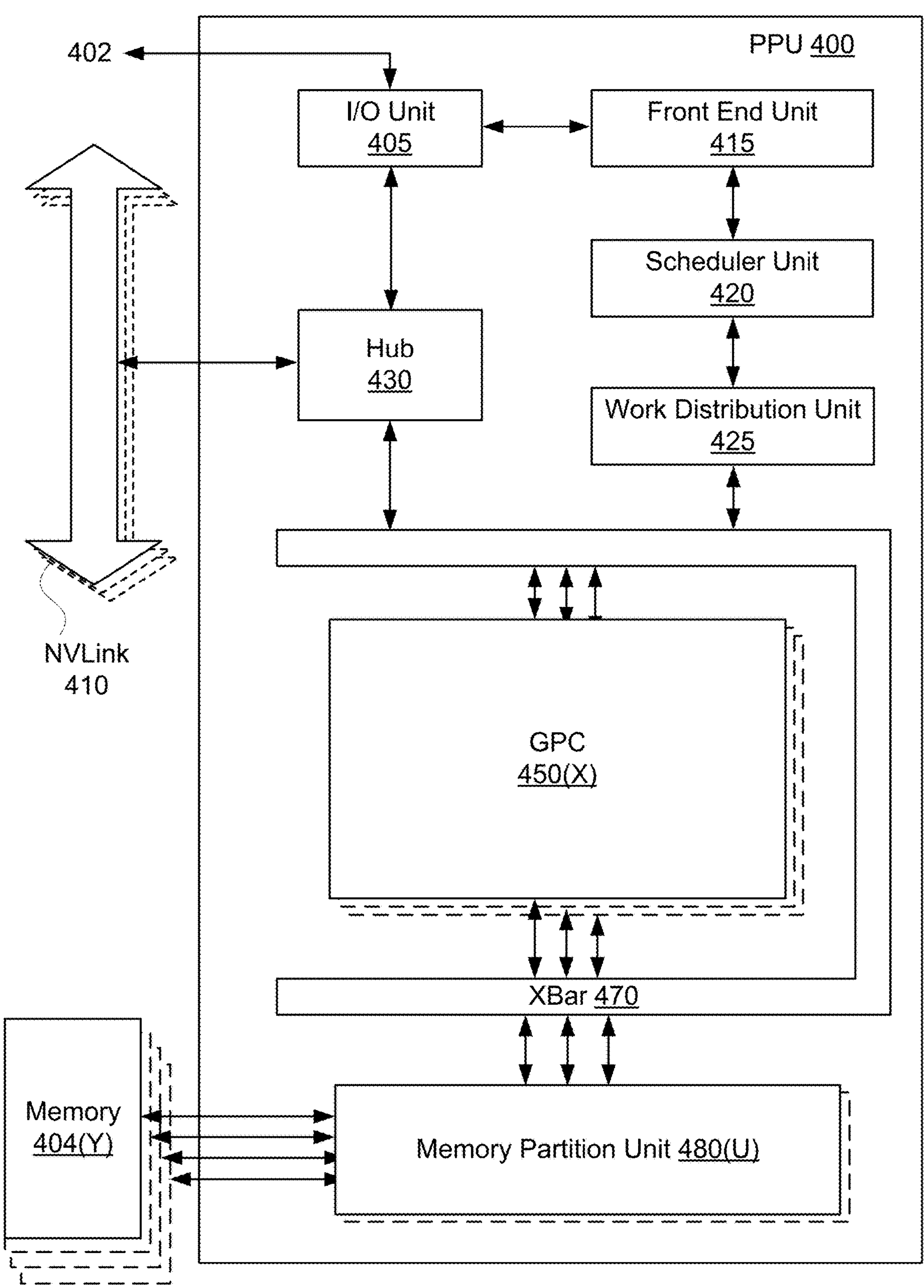
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the language instructed temporal localization in videos and/or training tasks associated with developing. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QOS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
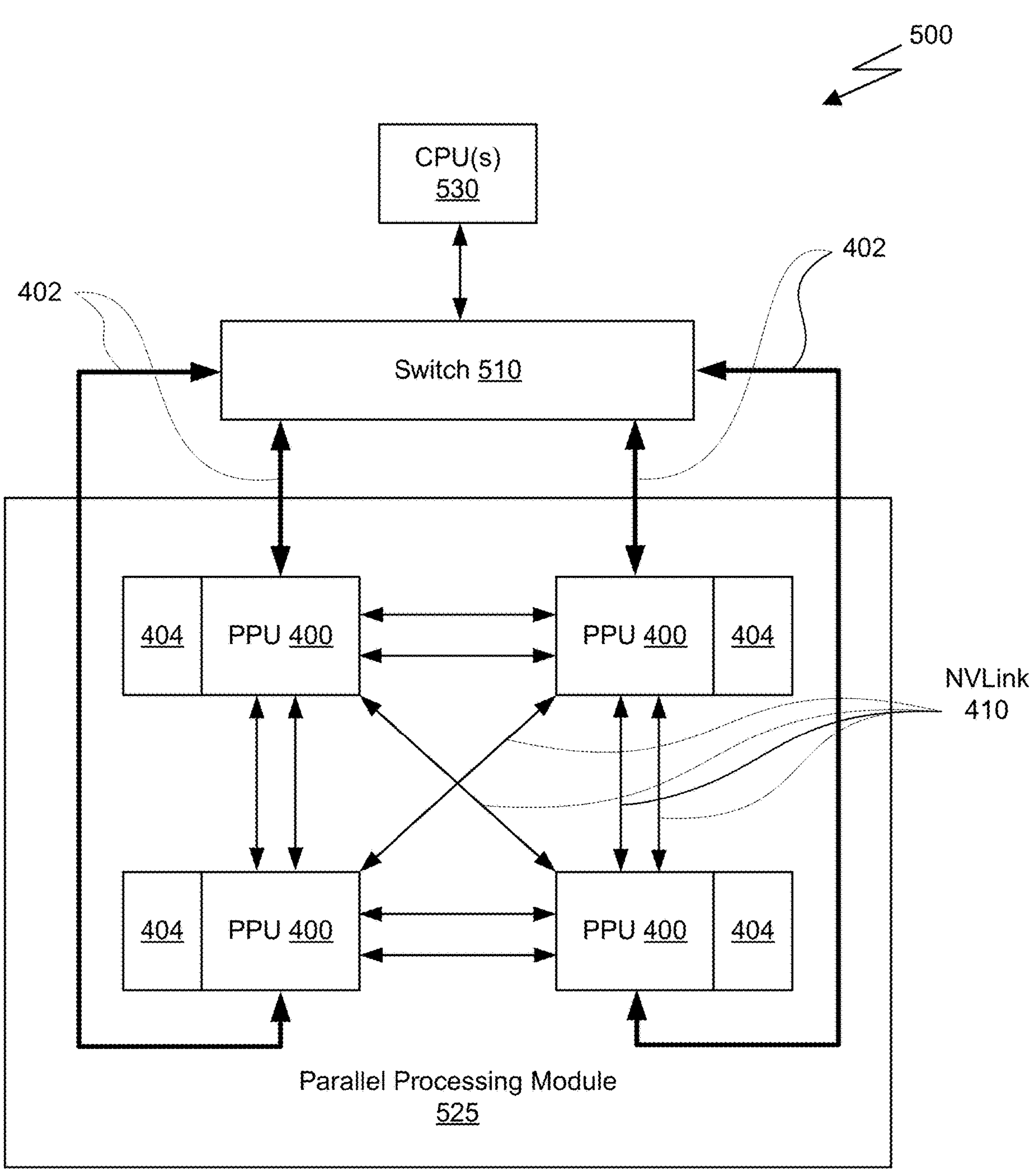
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the language instructed temporal localization in videos. The processing system 500 includes a CPU 530, switch 510, and multiple PPUs 400, and respective memories 404.

Figure 5B:
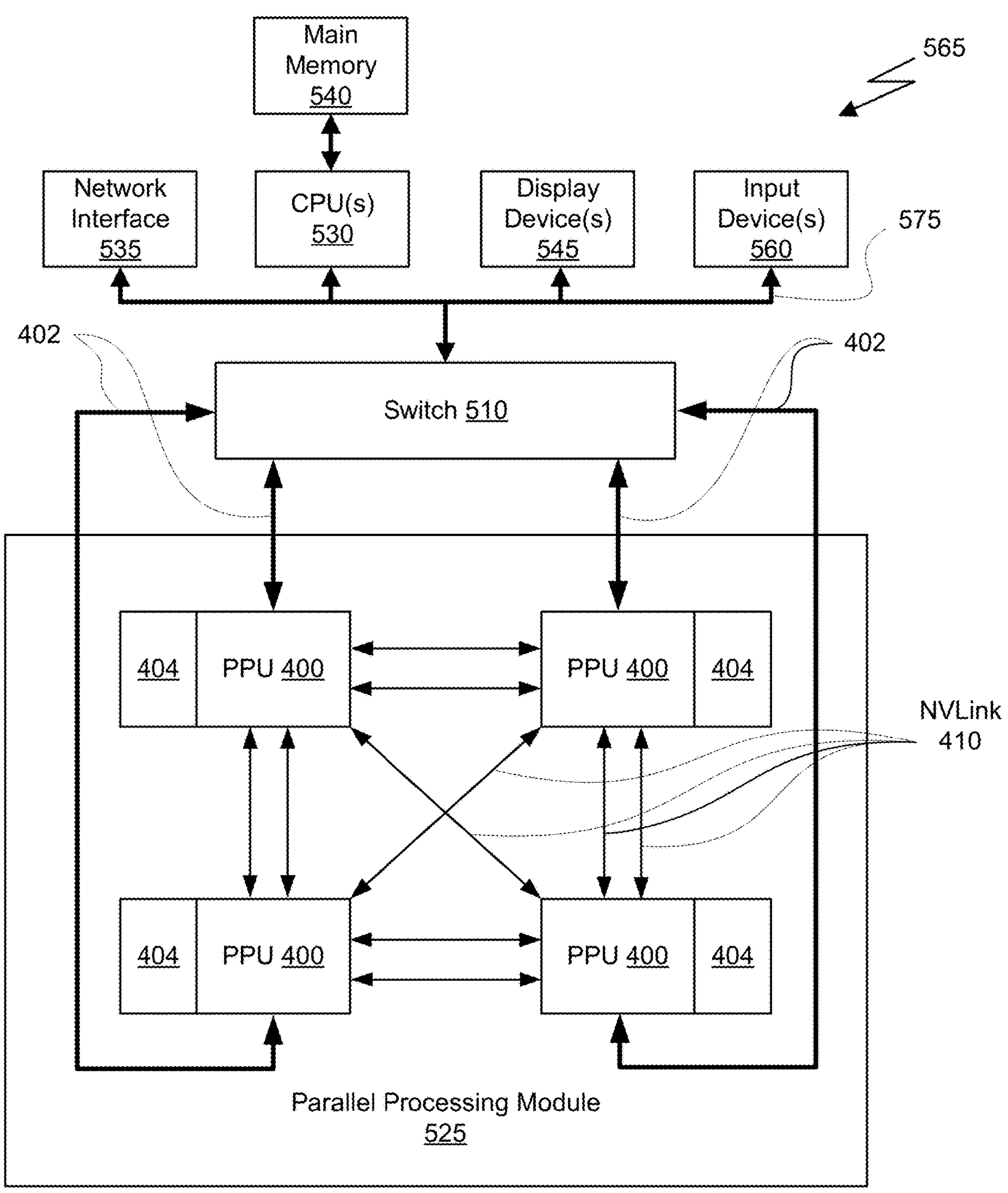
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the language instructed temporal localization in videos.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an ×86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
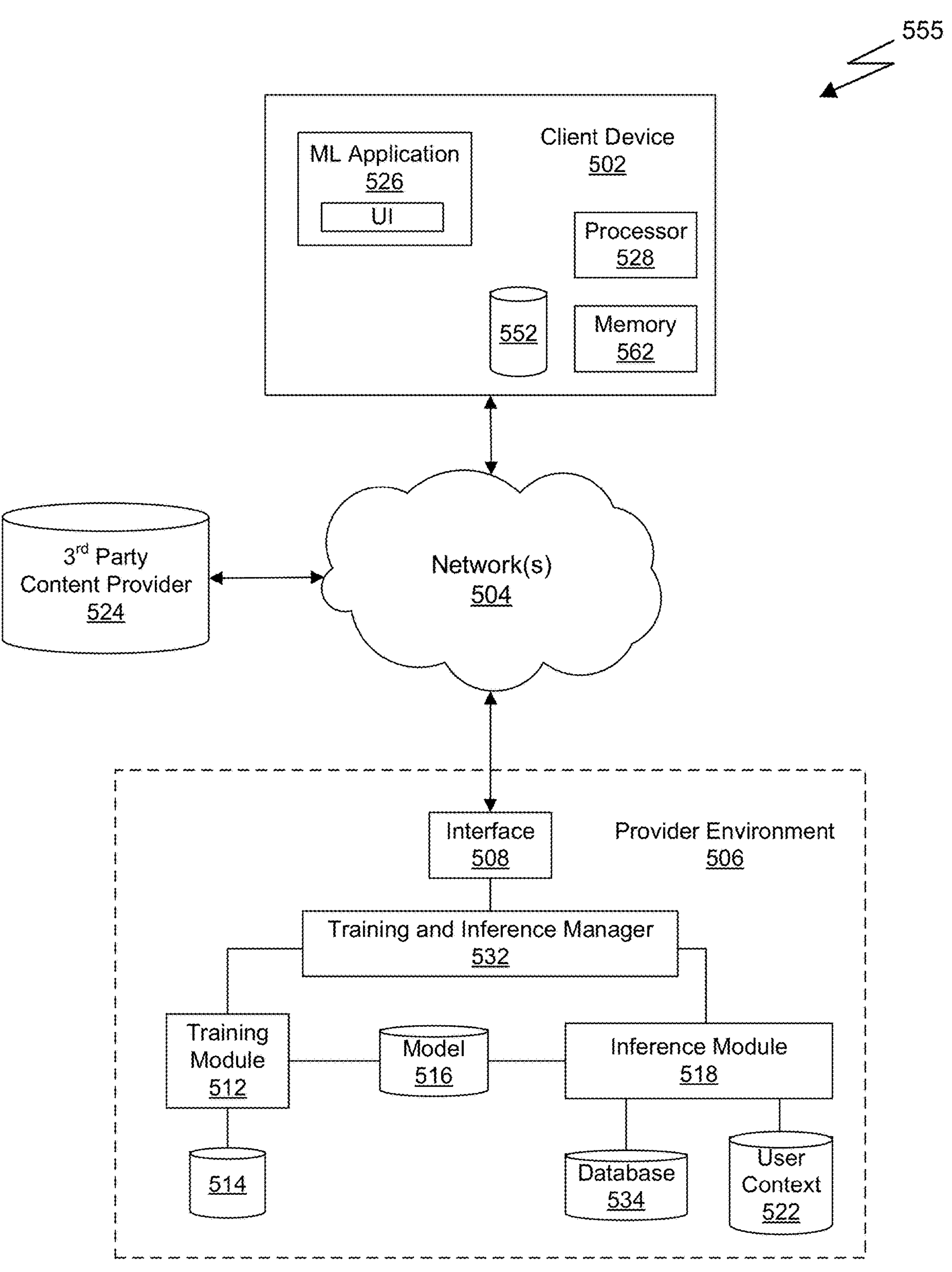
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Model Training and Deployment

Figure 6:
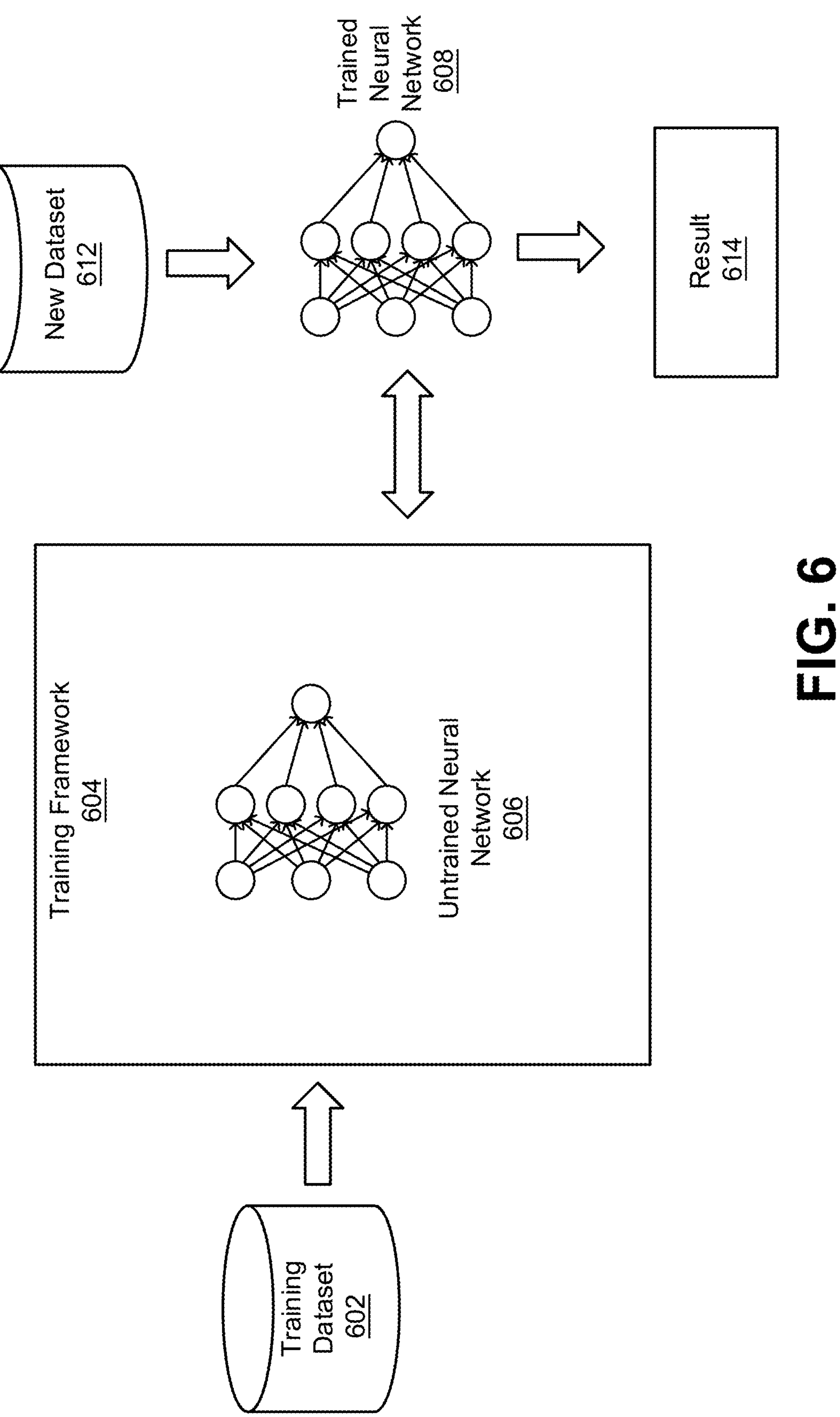
FIG. 6 illustrates training and deployment of a deep neural network, according to at least one embodiment.

FIG. 6 illustrates training and deployment of a deep neural network, according to at least one embodiment. In at least one embodiment, untrained neural network 606 is trained using a training dataset 602. In at least one embodiment, training framework 604 is a PyTorch framework, whereas in other embodiments, training framework 604 is a TensorFlow, Boost, Caffe, Microsoft Cognitive Toolkit/CNTK, MXNet, Chainer, Keras, Deeplearning4*j*, or other training framework. In at least one embodiment, training framework 604 trains an untrained neural network 606 and enables it to be trained using processing resources described herein to generate a trained neural network 608. In at least one embodiment, weights may be chosen randomly or by pre-training using a deep belief network. In at least one embodiment, training may be performed in either a supervised, partially supervised, or unsupervised manner.

In at least one embodiment, untrained neural network 606 is trained using supervised learning, wherein training dataset 602 includes an input paired with a desired output for an input, or where training dataset 602 includes input having a known output and an output of neural network 606 is manually graded. In at least one embodiment, untrained neural network 606 is trained in a supervised manner and processes inputs from training dataset 602 and compares resulting outputs against a set of expected or desired outputs. In at least one embodiment, errors are then propagated back through untrained neural network 606. In at least one embodiment, training framework 604 adjusts weights that control untrained neural network 606. In at least one embodiment, training framework 604 includes tools to monitor how well untrained neural network 606 is converging towards a model, such as trained neural network 608, suitable to generating correct answers, such as in result 614, based on input data such as a new dataset 612. In at least one embodiment, training framework 604 trains untrained neural network 606 repeatedly while adjust weights to refine an output of untrained neural network 606 using a loss function and adjustment algorithm, such as stochastic gradient descent. In at least one embodiment, training framework 604 trains untrained neural network 606 until untrained neural network 606 achieves a desired accuracy. In at least one embodiment, trained neural network 608 can then be deployed to implement any number of machine learning operations.

In at least one embodiment, untrained neural network 606 is trained using unsupervised learning, wherein untrained neural network 606 attempts to train itself using unlabeled data. In at least one embodiment, unsupervised learning training dataset 602 will include input data without any associated output data or "ground truth" data. In at least one embodiment, untrained neural network 606 can learn groupings within training dataset 602 and can determine how individual inputs are related to untrained dataset 602. In at least one embodiment, unsupervised training can be used to generate a self-organizing map in trained neural network 608 capable of performing operations useful in reducing dimensionality of new dataset 612. In at least one embodiment, unsupervised training can also be used to perform anomaly detection, which allows identification of data points in new dataset 612 that deviate from normal patterns of new dataset 612.

In at least one embodiment, semi-supervised learning may be used, which is a technique in which in training dataset 602 includes a mix of labeled and unlabeled data. In at least one embodiment, training framework 604 may be used to perform incremental learning, such as through transferred learning techniques. In at least one embodiment, incremental learning enables trained neural network 608 to adapt to new dataset 612 without forgetting knowledge instilled within trained neural network 608 during initial training.

In at least one embodiment, training framework 604 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA. In at least one embodiment, an SoC, integrated circuit, or processor uses OpenVINO to perform operations described herein.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV, OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

FIG. 7 illustrates a deep learning application processor 700, according to at least one embodiment. In at least one embodiment, deep learning application processor 700 uses instructions that, if executed by deep learning application processor 700, cause deep learning application processor 700 to perform some or all of processes and techniques described throughout this disclosure. In at least one embodiment, deep learning application processor 700 is an application-specific integrated circuit (ASIC). In at least one embodiment, application processor 700 performs matrix multiply operations either "hard-wired" into hardware as a result of performing one or more instructions or both. In at least one embodiment, deep learning application processor 700 includes, without limitation, processing clusters 710(1)-710(12), Inter-Chip Links ("ICLs") 720(1)-720 (12), Inter-Chip Controllers ("ICCs") 730(1)-730(2), high-bandwidth memory second generation ("HBM2") 740(1)-740(4), memory controllers ("Mem Ctrlrs") 742(1)-742(4), high bandwidth memory physical layer ("HBM PHY") 744(1)-744(4), a management-controller central processing unit ("management-controller CPU") 750, a Serial Peripheral Interface, Inter-Integrated Circuit, and General Purpose Input/Output block ("SPI, $I^2C$, GPIO") 760, a peripheral component interconnect express controller and direct memory access block ("PCIe Controller and DMA") 770, and a sixteen-lane peripheral component interconnect express port ("PCI Express×16") 780.

In at least one embodiment, processing clusters 710 may perform deep learning operations, including inference or prediction operations based on weight parameters calculated one or more training techniques, including those described herein. In at least one embodiment, each processing cluster 710 may include, without limitation, any number and type of processors. In at least one embodiment, deep learning application processor 700 may include any number and type of processing clusters 700. In at least one embodiment, Inter-Chip Links 720 are bi-directional. In at least one embodiment, Inter-Chip Links 720 and Inter-Chip Controllers 730 enable multiple deep learning application processors 700 to exchange information, including activation information resulting from performing one or more machine learning algorithms embodied in one or more neural networks. In at least one embodiment, deep learning application processor 700 may include any number (including zero) and type of ICLs 720 and ICCs 730.

In at least one embodiment, HBM2s 740 provide a total of 32 Gigabytes (GB) of memory. In at least one embodiment, HBM2 740 (i) is associated with both memory controller 742(*i*) and HBM PHY 744(*i*) where "i" is an arbitrary integer. In at least one embodiment, any number of HBM2s 740 may provide any type and total amount of high bandwidth memory and may be associated with any number (including zero) and type of memory controllers 742 and HBM PHYs 744. In at least one embodiment, SPI, $I^2C$, GPIO 760, PCIe Controller and DMA 770, and/or PCIe 780 may be replaced with any number and type of blocks that enable any number and type of communication standards in any technically feasible fashion.

Logic 1115 are used to perform inferencing and/or training operations associated with one or more embodiments. In at least one embodiment, deep learning application processor is used to train a machine learning model, such as a neural network, to predict or infer information provided to deep learning application processor 700. In at least one embodiment, deep learning application processor 700 is used to infer or predict information based on a trained machine learning model (e.g., neural network) that has been trained by another processor or system or by deep learning application processor 700. In at least one embodiment, processor 700 may be used to perform one or more neural network use cases described herein.

Figure 8:
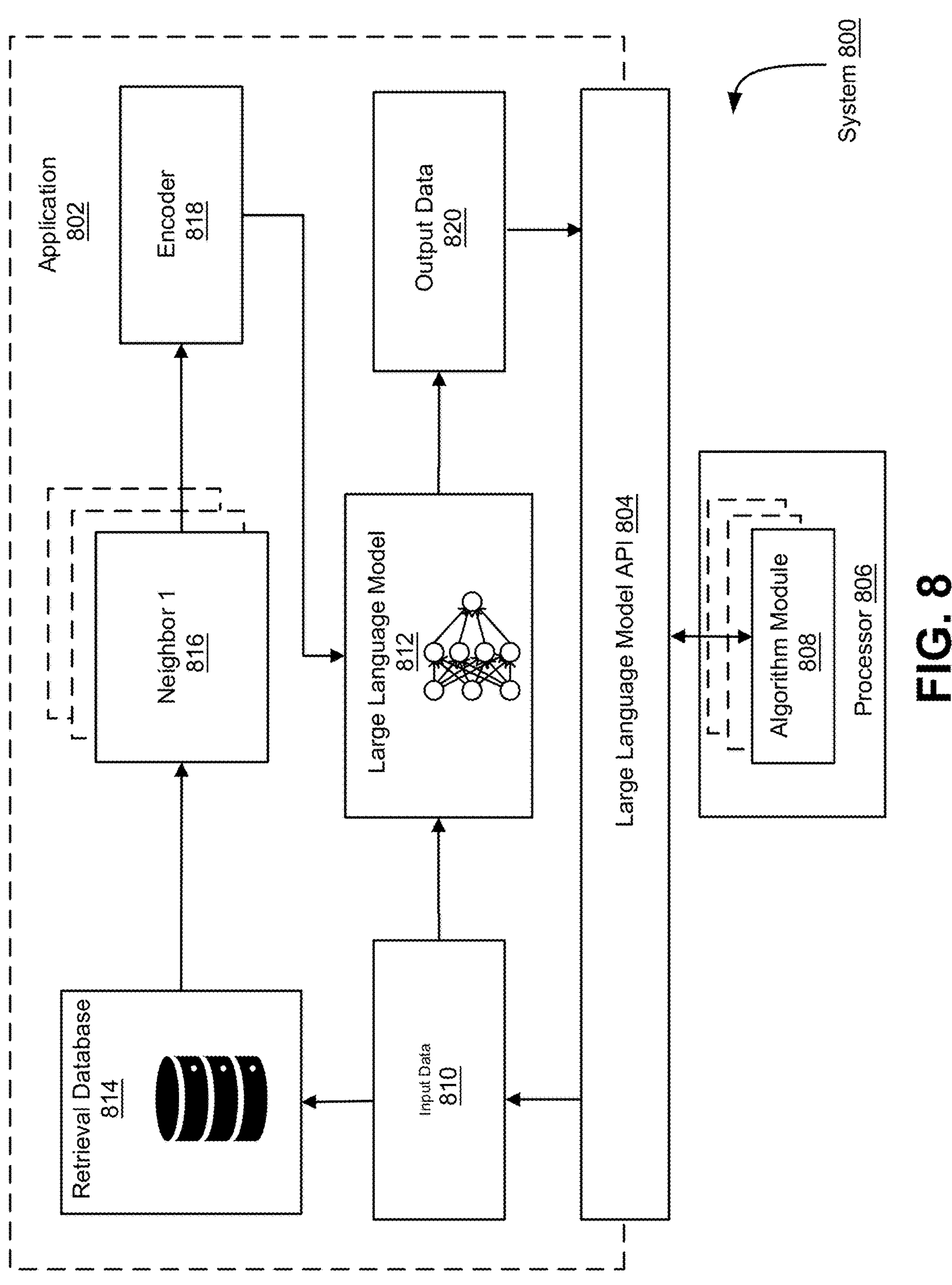
FIG. 8 provides a system diagram illustrating a system for interfacing with an application to process data, according to at least one embodiment.

FIG. 8 is a system diagram illustrating system 800 for interfacing with an application 802 to process data, according to at least one embodiment. In at least one embodiment, application 802 uses large language model (LLM) 812 to generate output data 820 based, at least in part, on input data 810. In at least one embodiment, input data 810 is a text prompt. In at least one embodiment, input data 810 includes unstructured text. In at least one embodiment, input data 810 includes a sequence of tokens. In at least one embodiment, a token is a portion of input data. In at least one embodiment, a token is a word. In at least one embodiment, a token is a character. In at least one embodiment, a token is a subword. In at least one embodiment, input data 810 is formatted in Chat Markup Language (ChatML). In at least one embodiment, input data 810 is an image. In at least one embodiment, input data 810 is one or more video frames. In at least one embodiment, input data 810 is any other expressive medium.

In at least one embodiment, large language model 812 comprises a deep neural network. In at least one embodiment, a deep neural network is a neural network with two or more layers. In at least one embodiment, large language model 812 comprises a transformer model. In at least one embodiment, large language model 812 comprises a neural network configured to perform natural language processing. In at least one embodiment, large language model 812 is configured to process one or more sequences of data. In at least one embodiment, large language model 812 is configured to process text. In at least one embodiment, weights and biases of a large language model 812 are configured to process text. In at least one embodiment, large language model 812 is configured to determine patterns in data to perform one or more natural language processing tasks. In at least one embodiment, a natural language processing task comprises text generation. In at least one embodiment, a natural language processing task comprises question answering. In at least one embodiment, performing a natural language processing task results in output data 820.

In at least one embodiment, a processor uses input data 810 to query retrieval database 814. In at least one embodiment, retrieval database 814 is a key-value store. In at least one embodiment, retrieval database 814 is a corpus used to train large language model 812. In at least one embodiment, a processor uses retrieval database 814 to provide large language model 812 with updated information. In at least one embodiment, retrieval database 814 comprises data from an internet source. In at least one embodiment, large language model 812 does not use retrieval database 814 to perform inferencing.

In at least one embodiment, an encoder encodes input data 810 into one or more feature vectors. In at least one embodiment, an encoder encodes input data 810 into a sentence embedding vector. In at least one embodiment, a processor uses said sentencing embedding vector to perform a nearest neighbor search to generate one or more neighbors 816. In at least one embodiment, one or more neighbors 816 is value in retrieval database 814 corresponding to a key comprising input data 810. In at least one embodiment, one or more neighbors 816 comprise text data. In at least one embodiment, encoder 818 encodes one or more neighbors 816. In at least one embodiment, encoder 818 encodes one or more neighbors 816 into a text embedding vector. In at least one embodiment, encoder 818 encodes one or more neighbors 816 into a sentence embedding vector. In at least one embodiment, large language model 816 uses input data 810 and data generated by encoder 818 to generate output data 820. In at least one embodiment, processor 806 interfaces with application 802 using large language model (LLM) application programming interface(s) (API(s)) 804. In at least one embodiment, processor 806 accesses large language model 816 using large language model (LLM) application programming interface(s) (API(s)) 804.

In at least one embodiment, output data 820 comprise computer instructions. In at least one embodiment, output data 820 comprise instructions written in CUDA programming language. In at least one embodiment, output data 820 comprise instructions to be performed by processor 806. In at least one embodiment, output data 820 comprise instructions to control execution of one or more algorithm modules 808. In at least one embodiment, one or more algorithm modules 808 comprise, for example, one or more neural networks to perform pattern recognition. In at least one embodiment, one or more algorithm modules 808 comprise, for example, one or more neural networks to perform frame generation. In at least one embodiment, one or more algorithm modules 808 comprise, for example, one or more neural networks to generate a drive path. In at least one embodiment, one or more algorithm modules 808 comprise, for example, one or more neural networks to generate a 5G signal. In at least one embodiment, processor 806 interfaces with application 802 using large language model (LLM) application programming interface(s) (API(s)) 804. In at least one embodiment, processor 806 may use one or more parallel computing platforms and/or programming models (e.g., NVIDIA's CUDA model).

In at least one embodiment, aspects of systems and techniques described herein in relation to FIG. 8 are incorporated into aspects of preceding figure(s). For example, in at least one embodiment, an apparatus depicted in preceding figure(s) includes processor 806.

For example, in at least one embodiment, system 800 uses ChatGPT to write CUDA code. For example, in at least one embodiment, system 800 uses ChatGPT to train an object classification neural network. For example, in at least one embodiment, system 800 uses ChatGPT and a neural network to identify a driving path. For example, in at least one embodiment, system 800 uses ChatGPT and a neural network to generate a 5G signal.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oncAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oncAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors, or any other logic circuit further described herein to perform one or more computing operations.

It should be noted that, while example embodiments described herein may relate to a CUDA programming model, techniques described herein can be utilized with any suitable programming model, such HIP, oncAPI, and/or variations thereof.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for language instructed temporal localization in video, the method comprising:

receiving multimodal input comprising video input and natural language input;

pre-processing the video input in a video pre-processing pathway to generate a plurality of fast tokens and a plurality of slow tokens, each of the plurality of fast tokens representing a relative timestamp in the video, the pre-processing the video input comprising:

dividing the video into a plurality of segments and providing a frame for each respective segment, generating, for each respective frame, a respective fast token of the plurality of fast tokens, sparsely sampling the plurality of frames to select a plurality of spatial information frames, and generating, for the plurality of spatial information frames, the plurality of slow tokens;

pre-processing the natural language input in a language pre-processing pathway to generate a plurality of language tokens;

providing, to a pre-trained multimodal large language model (LLM), the plurality of fast tokens, the plurality of slow tokens, and the plurality of language tokens; and processing, by the pre-trained multimodal LLM, the plurality of fast tokens, the plurality of slow tokens, and the plurality of language tokens to generate output responsive to the natural language input, the output comprising a natural language caption corresponding to content in the video.

2. The computer-implemented method according to claim 1, wherein the pre-trained multimodal LLM is pre-trained on a reasoning temporal localization (RTL) task.

3. The computer-implemented method according to claim 2, wherein the pre-trained multimodal LLM is pre-trained on the RTL task with an RTL training dataset, the RTL training dataset including a plurality of query: answer pairs, each respective answer of each respective query: answer pair comprising an absolute timestamp and a natural language caption responsive to the corresponding query.

4. The computer-implemented method according to claim 2, wherein the pre-trained multimodal LLM is further pre-trained on at least one of:

a dense video captioning task, an event localization task, a video question answering task, and/or a natural language visual question answering task.

5. The computer-implemented method according to claim 1, wherein the output further comprises an absolute timestamp.

6. The computer-implemented method according to claim 1, wherein the dividing the video into a plurality of segments comprises pre dividing the video into a plurality of equal length segments.

7. The computer-implemented method according to claim 6, wherein the pre-processing the video input in the video pre-processing pathway further comprises:

downsampling the plurality of spatial information frames to provide a plurality of downsampled spatial information frames, wherein the plurality of slow tokens are generated for the plurality of downsampled spatial information frames.

8. The computer-implemented method according to claim 7, wherein the number of the plurality of equal length segments is T, wherein the pre-processing the video input in the video-preprocessing pathway further comprises, after the dividing the video into the plurality of equal length segments and providing a frame for each respective segment, generating M visual tokens for each respective frame, wherein the generating the respective fast token for each respective frame comprises averaging the M visual tokens generated for the respective frame to generate the respective fast token, wherein the sparsely sampling the plurality of frames to select a plurality of spatial information frames comprises selecting s spatial information frames, wherein the downsampling the plurality of spatial information frames is performed using an s×s spatial average pooling, and wherein the generating, for the plurality of downsampled spatial information frames, the plurality of slow tokens comprises generating a total of $$M = \frac{M}{s2} \times s^2$$

slow tokens.

9. The computer-implemented method according to claim 8, wherein T>2 and $s^2$<M.

10. A system, comprising:

a memory; and processing circuitry connected to the memory, wherein the processing circuitry is configured to:

receive multimodal input comprising video input and natural language input;

pre-process the video input in a video pre-processing pathway to generate a plurality of fast tokens and a plurality of slow tokens by:

dividing the video into a plurality of segments and providing a frame for each respective segment, generating, for each respective frame, a respective fast token of the plurality of fast tokens, each of the plurality of fast tokens representing a relative timestamp in the video, sparsely sampling the plurality of frames to select a plurality of spatial information frames, generating, for the plurality of spatial information frames, the plurality of slow tokens;

pre-process the natural language input in a language pre-processing pathway to generate a plurality of language tokens;

provide, to a pre-trained multimodal large language model (LLM), the plurality of fast tokens, the plurality of slow tokens, and the plurality of language tokens; and process, by the pre-trained multimodal LLM, the plurality of fast tokens, the plurality of slow tokens, and the plurality of language tokens to generate output responsive to the natural language input, the output comprising a natural language caption corresponding to content in the video.

11. The system according to 10, wherein the pre-trained multimodal LLM is pre-trained on a reasoning temporal localization (RTL) task.

12. A non-transitory computer-readable media storing computer instructions that, when executed by one or more processors, cause the one or more processors to perform the steps of:

receiving multimodal input comprising video input and natural language input;

pre-processing the video input in a video pre-processing pathway to generate a plurality of fast tokens and a plurality of slow tokens, each of the plurality of fast tokens representing a relative timestamp in the video, the pre-processing the video input comprising:

dividing the video into a plurality of segments and providing a frame for each respective segment, generating, for each respective frame, a respective fast token of the plurality of fast tokens, sparsely sampling the plurality of frames to select a plurality of spatial information frames, and generating, for the plurality of spatial information frames, the plurality of slow tokens;

pre-processing the natural language input in a language pre-processing pathway to generate a plurality of language tokens;

providing, to a pre-trained multimodal large language model (LLM), the plurality of fast tokens, the plurality of slow tokens, and the plurality of language tokens; and processing, by the pre-trained multimodal LLM, the plurality of fast tokens, the plurality of slow tokens, and the plurality of language tokens to generate output responsive to the natural language input, the output comprising a natural language caption corresponding to content in the video.

13. The non-transitory computer-readable media according to claim 12, wherein the pre-trained multimodal LLM is pre-trained on a reasoning temporal localization (RTL) task.

14. A computer-implemented method for utilizing a multimodal large language model (LLM) in performing language instructed temporal localization in video, wherein the multimodal LLM has been pre-trained on a reasoning temporal localization task, the method comprising:

receiving multimodal input comprising video input and natural language input;

pre-processing the video input in a video pre-processing pathway to generate a plurality of fast tokens and a plurality of slow tokens, each of the plurality of fast tokens representing a relative timestamp in the video, the pre-processing the video input comprising:

dividing the video into a plurality of segments and providing a frame for each respective segment, generating, for each respective frame, a respective fast token of the plurality of fast tokens, sparsely sampling the plurality of frames to select a plurality of spatial information frames, and generating, for the plurality of spatial information frames, the plurality of slow tokens;

pre-processing the natural language input in a language pre-processing pathway to generate a plurality of language tokens;

providing, to a pre-trained multimodal large language model (LLM), the plurality of fast tokens, the plurality of slow tokens, and the plurality of language tokens; and processing, by the pre-trained multimodal LLM, the plurality of fast tokens, the plurality of slow tokens, and the plurality of language tokens to generate output responsive to the natural language input, the output comprising a natural language caption corresponding to content in the video.

15. The computer-implemented method according to claim 14, wherein the output further comprises an absolute timestamp.

16. The computer-implemented method according to claim 14, wherein the pre-trained multimodal LLM is pre-trained on the RTL task with an RTL training dataset, the RTL training dataset including a plurality of query: answer pairs, each respective answer of each respective query: answer pair comprising an absolute timestamp and a natural language caption responsive to the corresponding query.

17. The computer-implemented method according to claim 14, wherein the pre-trained multimodal LLM is further pre-trained on at least one of:

a dense video captioning task, an event localization task, a video question answering task, and/or a natural language visual question answering task.

18. The computer-implemented method according to claim 14, wherein the dividing the video into a plurality of segments comprises dividing the video into a plurality of equal length segments.

19. The computer-implemented method according to claim 18, wherein the pre-processing the video input in the video pre-processing pathway further comprises:

downsampling the plurality of spatial information frames to provide a plurality of downsampled spatial information frames, wherein the plurality of slow tokens are generated for the plurality of downsampled spatial information frames, the plurality of slow tokens.

20. The computer-implemented method according to claim 19, wherein the number of the plurality of equal length segments is T, wherein the pre-processing the video input in the video-preprocessing pathway further comprises, after the dividing the video into the plurality of equal length segments and providing a frame for each respective segment, generating M visual tokens for each respective frame, wherein the generating the respective fast token for each respective frame comprises averaging the M visual tokens generated for the respective frame to generate the respective fast token, wherein the sparsely sampling the plurality of frames to select a plurality of spatial information frames comprises selecting s spatial information frames, wherein the downsampling the plurality of spatial information frames is performed using an s×s spatial average pooling, and wherein the generating, for the plurality of downsampled spatial information frames, the plurality of slow tokens comprises generating a total of $$M = \frac{M}{s2} \times s^2$$

slow tokens.

21. The computer-implemented method according to claim 20, wherein T>2 and $s^2$<M.

22. A computer-implemented method for training a multimodal large language model (LLM) to perform language instructed temporal localization in video, the method comprising:

providing a reasoning temporal localization (RTL) training dataset, the RTL training dataset comprising:

a set of videos;

a collection of query: answer pairs, the collection of query: answer pairs comprising, for each video, at least one respective query: answer pair, each respective query: answer pair comprising a query including language input that requires temporal reasoning and an answer including an absolute timestamp and a natural language caption responsive to the corresponding query; and training a multimodal LLM using the RTL training dataset, wherein the training the multimodal LLM using the RTL training dataset comprises:

providing, to the multimodal LLM for each combination of a video and a corresponding query: answer pair, a plurality of fast tokens, a plurality of slow tokens, and a plurality of language tokens, and performing, for each respective query: answer pair, a loss calculation using a loss function, wherein the loss calculation measures a difference between output provided by the multimodal LLM and the respective answer of the respective query: answer pair, wherein the plurality of fast tokens and the plurality of slow tokens are generated by pre-processing the video input in a video pre-processing pathway, each of the plurality of fast tokens representing a relative timestamp in the video, and wherein the plurality of language tokens are generated by pre-processing the natural language input in a language pre-processing pathway to generate a plurality of language tokens.

23. The computer-implemented method according to claim 22, wherein the loss calculation includes a timestamp component and a textual component, wherein the timestamp component measures a difference between an absolute timestamp output by the multimodal LLM and the absolute timestamp of the respective answer, and wherein the textual component measures a difference between a caption output by the multimodal LLM and the caption of the respective answer.

24. The computer-implemented method according to claim 22, further comprising:

calculating, via backpropagation, gradients of the loss function using results of the loss calculation; and updating, using the calculated gradients and an optimization algorithm, parameters of the multimodal LLM.

25. The computer-implemented method of claim 22, further comprising training the multimodal LLM using at least one of:

a dense video captioning task training dataset, an event localization task training dataset, a video question answering task training dataset, and/or a natural language visual question answering task training dataset.

26. The computer-implemented method according to claim 22, wherein the pre-processing the video input in the video pre-processing pathway comprises:

dividing the video into a plurality of equal length segments and providing a frame for each respective segment;

generating, for each respective frame, a respective fast token of the plurality of fast tokens.

27. The computer-implemented method according to claim 26, wherein the pre-processing the video input in the video pre-processing pathway further comprises:

sparsely sampling the plurality of frames to select a plurality of spatial information frames;

downsampling the plurality of spatial information frames to provide a plurality of downsampled spatial information frames; and generating, for the plurality of downsampled spatial information frames, the plurality of slow tokens.

28. The computer-implemented method according to claim 27, wherein the number of the plurality of equal length segments is T, wherein the pre-processing the video input in the video-preprocessing pathway further comprises, after the dividing the video into the plurality of equal length segments and providing a frame for each respective segment, generating M visual tokens for each respective frame, wherein the generating the respective fast token for each respective frame comprises averaging the M visual tokens generated for the respective frame to generate the respective fast token, wherein the sparsely sampling the plurality of frames to select a plurality of spatial information frames comprises selecting s spatial information frames, wherein the downsampling the plurality of spatial information frames is performed using an s×s spatial average pooling, and wherein the generating, for the plurality of downsampled spatial information frames, the plurality of slow tokens comprises generating a total of $$M = \frac{M}{s2} \times s^2$$

slow tokens.

29. The computer-implemented method according to claim 28, wherein T>2 and $s^2$<M.

30. A system, comprising:

a memory, the memory storing a reasoning temporal localization (RTL) training dataset, the RTL training dataset comprising:

a set of videos;

a collection of query: answer pairs, the collection of query: answer pairs comprising, for each video, at least one respective query: answer pair, each respective query: answer pair comprising a query including language input that requires temporal reasoning and an answer including an absolute timestamp and a natural language caption responsive to the corresponding query; and processing circuitry connected to the memory, wherein the processing circuitry is configured to:

train a multimodal LLM using the RTL training dataset, wherein the training the multimodal LLM using the RTL training dataset comprises:

providing, to the multimodal LLM for each combination of a video and a corresponding query: answer pair, a plurality of fast tokens, a plurality of slow tokens, and a plurality of language tokens, and performing, for each respective query: answer pair, a loss calculation using a loss function, wherein the loss calculation measures a difference between output provided by the multimodal LLM and the respective answer of the respective query: answer pair, wherein the plurality of fast tokens and the plurality of slow tokens are generated by pre-processing the video input in a video pre-processing pathway, each of the plurality of fast tokens representing a relative timestamp in the video, and wherein the plurality of language tokens are generated by pre-processing the natural language input in a language pre-processing pathway to generate a plurality of language tokens.

31. The system according to claim 30, wherein the pre-processing the video input in the video pre-processing pathway comprises:

dividing the video into a plurality of equal length segments and providing a frame for each respective segment;

generating, for each respective frame, a respective fast token of the plurality of fast tokens.

32. The system according to claim 31, wherein the pre-processing the video input in the video pre-processing pathway further comprises:

sparsely sampling the plurality of frames to select a plurality of spatial information frames;

downsampling the plurality of spatial information frames to provide a plurality of downsampled spatial information frames; and generating, for the plurality of downsampled spatial information frames, the plurality of slow tokens.

33. The system according to claim 32, wherein the number of the plurality of equal length segments is T, wherein the pre-processing the video input in the video-preprocessing pathway further comprises, after the dividing the video into the plurality of equal length segments and providing a frame for each respective segment, generating M visual tokens for each respective frame, wherein the generating the respective fast token for each respective frame comprises averaging the M visual tokens generated for the respective frame to generate the respective fast token, wherein the sparsely sampling the plurality of frames to select a plurality of spatial information frames comprises selecting s spatial information frames, wherein the downsampling the plurality of spatial information frames is performed using an s×s spatial average pooling, and wherein the generating, for the plurality of downsampled spatial information frames, the plurality of slow tokens comprises generating a total of $$M = \frac{M}{s2} \times s^2$$

slow tokens.

34. A non-transitory computer-readable media storing computer instructions that, when executed by processing circuitry, cause the processing circuitry to perform the steps of:

providing a reasoning temporal localization (RTL) training dataset, the RTL training dataset comprising:

a set of videos;

a collection of query: answer pairs, the collection of query: answer pairs comprising, for each video, at least one respective query: answer pair, each respective query: answer pair comprising a query including language input that requires temporal reasoning and an answer including an absolute timestamp and a natural language caption responsive to the corresponding query; and training a multimodal LLM using the RTL training dataset, wherein the training the multimodal LLM using the RTL training dataset comprises:

providing, to the multimodal LLM for each combination of a video and a corresponding query: answer pair, a plurality of fast tokens, a plurality of slow tokens, and a plurality of language tokens, and performing, for each respective query: answer pair, a loss calculation using a loss function, wherein the loss calculation measures a difference between output provided by the multimodal LLM and the respective answer of the respective query: answer pair, wherein the plurality of fast tokens and the plurality of slow tokens are generated by pre-processing the video input in a video pre-processing pathway, each of the plurality of fast tokens representing a relative timestamp in the video, and wherein the plurality of language tokens are generated by pre-processing the natural language input in a language pre-processing pathway to generate a plurality of language tokens.

35. The non-transitory computer-readable media according to claim 34, wherein the pre-processing the video input in the video pre-processing pathway comprises:

dividing the video into a plurality of equal length segments and providing a frame for each respective segment;

generating, for each respective frame, a respective fast token of the plurality of fast tokens.

36. The non-transitory computer-readable media according to claim 35, wherein the pre-processing the video input in the video pre-processing pathway further comprises:

sparsely sampling the plurality of frames to select a plurality of spatial information frames;

downsampling the plurality of spatial information frames to provide a plurality of downsampled spatial information frames; and generating, for the plurality of downsampled spatial information frames, the plurality of slow tokens.

37. The non-transitory computer-readable media according to claim 36, wherein the number of the plurality of equal length segments is T, wherein the pre-processing the video input in the video-preprocessing pathway further comprises, after the dividing the video into the plurality of equal length segments and providing a frame for each respective segment, generating M visual tokens for each respective frame, wherein the generating the respective fast token for each respective frame comprises averaging the M visual tokens generated for the respective frame to generate the respective fast token, wherein the sparsely sampling the plurality of frames to select a plurality of spatial information frames comprises selecting s spatial information frames, wherein the downsampling the plurality of spatial information frames is performed using an s×s spatial average pooling, and wherein the generating, for the plurality of downsampled spatial information frames, the plurality of slow tokens comprises generating a total of $$M = \frac{M}{s2} \times s^2$$

slow tokens.

* * * * *